United States Patent [19]

Sekiguchi et al.

[11] Patent Number: 5,455,104
[45] Date of Patent: Oct. 3, 1995

[54] MAGNETIC RECORDING MEDIUM

[75] Inventors: Nobuyuki Sekiguchi; Narito Goto; Katsuyuki Takeda; Ryosuke Isobe; Hideki Takahashi, all of Hino, Japan

[73] Assignee: Konica Corporation, Japan

[21] Appl. No.: 159,367

[22] Filed: Nov. 30, 1993

[30] Foreign Application Priority Data

Dec. 2, 1992 [JP] Japan .................................. 4-323186
Dec. 4, 1992 [JP] Japan .................................. 4-325828

[51] Int. Cl.⁶ ........................................................ G11B 5/00
[52] U.S. Cl. ........................... 428/212; 428/323; 428/328; 428/329; 428/694 BM; 428/694 BS; 428/694 BN; 428/900
[58] Field of Search ...................... 428/212, 323, 428/328, 329, 694 BM, 694 BS, 694 BN, 900

[56] References Cited

U.S. PATENT DOCUMENTS

| | | | |
|---|---|---|---|
| 4,587,157 | 5/1986 | Brock et al. | 428/216 |
| 4,666,769 | 5/1987 | Miyata et al. | 428/323 |
| 5,032,428 | 7/1991 | Ogawa et al. | 427/130 |
| 5,057,364 | 10/1991 | Saito et al. | 428/323 |
| 5,080,967 | 1/1992 | Noguchi et al. | 428/323 |
| 5,258,223 | 11/1993 | Inaba et al. | 428/323 |
| 5,268,206 | 12/1993 | Komatsu et al. | 427/548 |

*Primary Examiner*—Stevan A. Resan
*Attorney, Agent, or Firm*—Jordan B. Bierman; Bierman and Muserlian

[57] ABSTRACT

The present invention provides a magnetic recording medium comprising a support, lower magnetic layer comprising ferromagnetic powder and nonmagnetic powder dispersed in a binder and an upper magnetic layer which contains ferromagnetic powder dispersed in a binder. The lower layer has a coercive force of not less than 200 Oe, a saturation magnetic flux density in the range of 5–1000 gauss and non magnetic particles with a specific gravity of not less than 2.5. The ferromagnetic powder of the upper layer is a ferromagnetic metal powder containing Fe and Al, and the ratio of non magnetic powder to magnetic powder in the lower magnetic layer is from 50/50 to 99/1.

7 Claims, 1 Drawing Sheet

MAGNETIC RECORDING MEDIUM

FIELD OF THE INVENTION

The present invention relates to a magnetic recording medium, more specifically a magnetic recording medium such as a magnetic tape, a magnetic disc or a magnetic card.

BACKGROUND OF THE INVENTION

It is a well-known fact that there are magnetic recording media having a multiple layer structure, rather than a single layer structure, for matching with each recording wavelength band.

Also, multiple layered magnetic recording media having a nonmagnetic layer as a lower layer are described in Japanese Patent Publication Open to Public Inspection (hereinafter referred to as Japanese Patent O.P.I. Publication) Nos. 187418/1988 and 191315/1988, which aim at improving the electromagnetic transferring property.

A magnetic recording media of multiple layer structure having a magnetic layer as a lower layer tends to have shorter recording wavelength with the increase in recording density. Other problems include layer thickness loss in recording and reproduction due to output reduction etc. when the magnetic layer is thick. To cope with this drawback, it is common practice to reduce the thickness of the upper magnetic layer. However, when upper layer thickness is reduced, the upper layer surface is susceptible to the dispersibility and surface condition of the lower layer, tending to result in a deteriorated electromagnetic transferring property. Another problem is that the lower magnetic layer becomes hard and brittle, resulting in increased magnetic flocculation, which can deteriorate surface smoothness.

Although a magnetic recording medium having a nonmagnetic layer as a lower layer surpasses a magnetic recording medium having a magnetic layer as a lower layer in surface smoothness and electromagnetic transferring property, lower layer coatability is poor due to poor properties of magnetic coating compound, such as low elasticity. The upper layer is therefore susceptible to the lower layer and has poor coatability. Another drawback is difficulty in layer thickness uniformization, which in turn cause a drawback of low productivity.

The lower nonmagnetic layer is also problematic that it is likely to have a high friction coefficient because of surface smoothness, resulting in a deteriorated running property and durability.

Also, when the nonmagnetic powder incorporated in the lower layer has a low true specific gravity, poor dispersibility of coating compound results in surface roughness upon coating, which in turn deteriorates the electromagnetic transferring property.

Another problem is that it is difficult to produce a magnetic recording medium having an excellent electric property and running property for a control signal due to a lack of control output because the lower layer is a nonmagnetic layer.

SUMMARY OF THE INVENTION

It is an object of the present invention to provide an electromagnetic recording medium which is excellent in electromagnetic transferring property, running durability and production stability, more specifically a magnetic recording medium suitable for digital recording, by solving the above problems in the above-described magnetic recording medium having a lower magnetic layer and nonmagnetic layer.

It is another object of the present invention to improve the surface property of a magnetic recording medium and provide a magnetic recording medium excellent in electric property and running property and suitable for recording with control signal.

The magnetic recording medium of the present invention comprises a support, a lower layer formed thereon which contains a nonmagnetic powder and ferromagnetic powder dispersed in a binder and an upper layer formed thereon which contains a ferromagnetic powder dispersed in a binder. The lower layer has a coercive force Hc of not less than 200 Oe and a saturation magnetic flux density of not less than 5 Gauss and not more than 1000 Gauss. The ferromagnetic powder of the upper layer is a ferromagnetic metal powder containing Fe and Al as component elements. Hereafter the unit for magnetic flux density Gauss is refered to G.

The ferromagnetic metal powder preferably contains Fe, Al and one or more rare earth elements selected from the group consisting of Sm, Nd, Y and Pr as component elements.

It is an embodiment of the present invention that a lower layer containing a nonmagnetic powder and ferromagnetic powder dispersed in a binder is present on the support and a magnetic layer containing a ferromagnetic powder dispersed in a binder is present thereon, the weight ratio A/B of nonmagnetic powder A to ferromagnetic powder B in the lower layer being $50/50 < A/B \leq 99/1$, nonmagnetic powder A having a true specific gravity of not less than 2.5 and the ferromagnetic powder being a ferromagnetic metal powder containing Fe and Al as component elements.

In this embodiment, the ferromagnetic powder preferably contains Fe, Al and one or more rare earth elements selected from the group consisting of Sm, Nd, Y and Pr as component elements.

It is another embodiment of the present invention that a lower layer containing a nonmagnetic powder and ferromagnetic powder dispersed in a binder is present on the support and a magnetic layer containing a ferromagnetic powder dispersed in a binder is present thereon, the lower layer having a coercive force Hc of not less than 200 Oe and a saturated magnetic flux density Bm of not less than 600 G and not more than 1000 G.

It is still another embodiment of the present invention that a lower layer containing a nonmagnetic powder and ferromagnetic powder dispersed in a binder is present on the support and a magnetic layer containing a ferromagnetic powder dispersed in a binder is present thereon, the weight ratio A/B of nonmagnetic powder A to ferromagnetic powder B in the lower layer being $50/50 < A/B < 200/100$, and nonmagnetic powder A having a true specific gravity of not less than 2.5.

The magnetic recording medium of the present invention preferably has a saturated magnetic flux density Bm of not less than 600 G and not more than 1000 G.

The weight ratio A/B of nonmagnetic powder A to ferromagnetic powder B in the lower layer is preferably $50/50 < A/B < 200/100$.

DETAILED DESCRIPTION OF THE INVENTION

Figure 1:
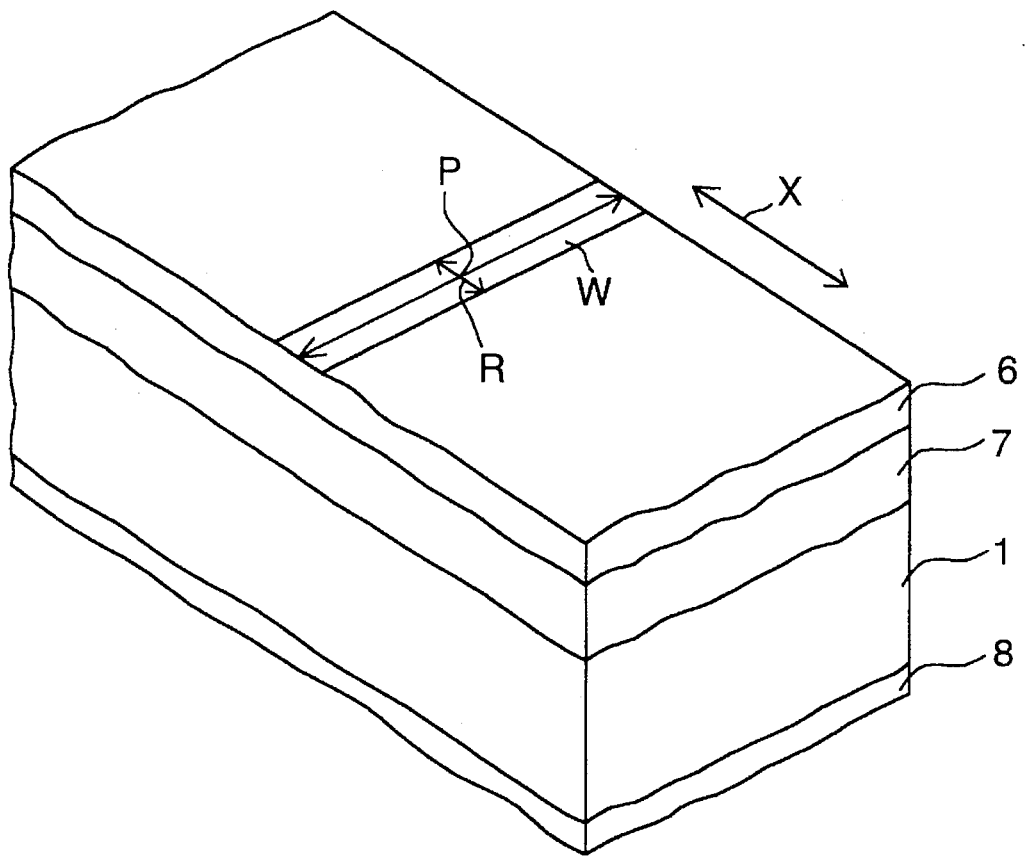
FIG. 1 illustrates measurement of the surface roughness $R_{10z}$ of a magnetic layer.
Figure 1:
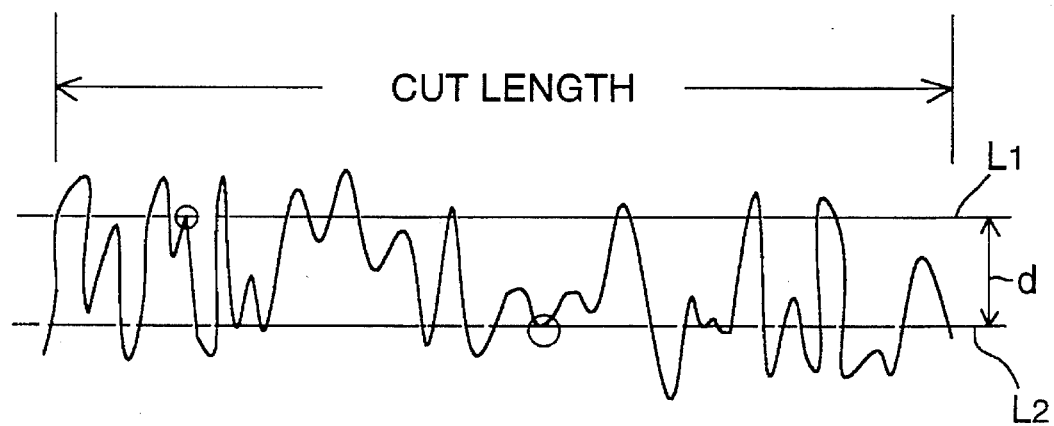

The magnetic recording medium of the present invention is hereinafter described in detail.

Nonmagnetic support

The support is made of a nonmagnetic material exemplified by polyesters such as polyethylene terephthalate and polyethylene 2,6-naphthalate, polyolefins such as polypropylene, cellulose derivatives such as cellulose triacetate and cellulose diacetate, and plastics such as polyamide and polycarbonate.

The support may be of any form, typically exemplified by a tape, a film, a sheet, a card, a disc and a drum.

The support's thickness is normally 3 to 100 μm, preferably 5 to 50 μm for a film or sheet, about 30 μm to 10 mm for a disc or card, and can be set as appropriate for recorder etc. in the case of a drum.

The support may have a single layer structure or a multiple layer structure. It may be subjected to a surface treatment such as a corona discharge treatment.

The support's face on which the above magnetic layer is not formed (back face) is preferably provided with a back-coating layer for improving the running property of the magnetic recording medium, preventing charging and transfer and for other purposes. Also, a subbing layer may be formed between the magnetic layer and the support.

Magnetic layer

In the present invention, the upper layer is a magnetic layer basically containing a magnetic powder dispersed in a binder.

Upper layer thickness is normally 0.01 to 0.7 μm, preferably 0.02 to 0.6 μm, and more preferably 0.02 to 0.4 μm. If the thickness is less than 0.01 μm, no sufficient output may be obtained at reproduction because of recording failure. If the thickness exceeds 0.7 μm, no sufficient reproduction output may be obtained due to layer thickness loss.

The upper magnetic layer preferably contains a ferromagnetic iron oxide powder, a ferromagnetic metal powder or a hexagonal magnetic powder. Of these, a ferromagnetic metal powder is preferably used for the present invention.

Examples of the ferromagnetic metal powder incorporated in the upper layer include ferromagnetic powders of Fe or Co, and magnetic metal powders based mainly on Fe, Ni or Co such as magnetic powders of Fe-Al alloy, Fe-Al-Ni alloy, Fe-Al-Zn alloy, Fe-Al-Co alloy, Fe-Al-Ca alloy, Fe-Ni-Al alloy, Fe-Ni-Co alloy, Fe-Ni-Si-Al-Mn alloy, Fe-Ni-Si-Al-Zn alloy, Fe-Al-Si alloy, Fe-Ni-Zn alloy, Fe-Ni-Mn alloy, Fe-Ni-Si alloy, Fe-Mn-Zn alloy, Fe-Co-Ni-P alloy and Ni-Co alloy. Particularly, Fe-based metal powders are excellent in electric properties.

On the other hand, from the viewpoint of corrosion resistance and dispersibility, preference is given to Fe-Al-based metal powders such as those of Fe-Al alloy, Fe-Al-Ca alloy, Fe-Al-Ni alloy, Fe-Al-Zn alloy, Fe-Al-Co alloy, Fe-Ni-Si-Al-Zn alloy and Fe-Ni-Si-Al alloy.

A ferromagnetic metal powder preferable for the object of the present invention is an iron-based magnetic metal powder. It desirably contains Al or Al and Ca in a ratio by weight of Fe:Al=100:0.5 to 100:20, and of Fe:Ca=100:0.1 to 100:10.

Limiting the Fe:Al ratio within the above range markedly improves corrosion resistance, and limiting the Fe:Ca ratio within the above range improves the electromagnetic transferring property, thus reducing dropouts.

Although the mechanism of such improvement in electromagnetic transferring property or dropout reduction remains unknown, increased coercive force, decreased flocculation, etc. associated with improved dispersibility may result in these desirable aspects.

With respect to the ferromagnetic metal powder for the present invention, the average major axis length as determined under a transmission electron microscope is normally not greater than 0.30 μm, preferably 0.10 to 0.22 μm, and more preferably 0.10 to 0.17 μm, and the crystal size as determined by X-ray diffraction is normally not greater than 200 Å, preferably 100 to 180 Å. The axial ratio (average major axis length/average minor axis length) is normally not more than 12, preferably not more than 10, and more preferably 5 to 9. Provided that the average major axis length, crystallite size and axial ratio of the ferromagnetic metal powder fall within these ranges, the electromagnetic transferring property can be improved. The shape of the ferromagnetic metal powder is preferably a spindle.

Also, the coercive force (Hc) of the ferromagnetic metal powder for the present invention is preferably within the range of 600–5000 Oe. Coercive forces out of this range are undesirable because the electromagnetic transferring property can deteriorate at coercive forces of lower than 600 Oe and because recording can fail with ordinary heads at coercive forces exceeding 5000 Oe.

Also, the saturation magnetism ($\sigma_s$), a magnetic property, of the ferromagnetic metal powder is preferably not lower than 70 emu/g in normal cases. If the saturation magnetism is lower than 70 emu/g, the electromagnetic transferring property can deteriorate.

In the present invention, it is preferable to use a ferromagnetic metal powder having a specific surface area of not less than 30 $m^2/g$, particularly not less than 45 $m^2/g$ as measured by the BET method, depending on the degree of increase in recording density.

A preferred ferromagnetic metal powder for the present invention is an Fe-Al based ferromagnetic metal powder (Fe:Al weight ratio 100:5, average major axis length 0.16 μm, Hc 1580 Oe, $\sigma_s$ 120 emu/g). The following magnetic powders are most suitable for the object of the present invention.

The ferromagnetic metal powder contains Fe, Al and one or more rare earth elements selected from the group consisting of Sm, Nd, Y and Pr as component elements.

With respect to the ferromagnetic metal powder for the present invention, it is preferable that the content ratio in the entire composition is 2 to 10 parts by weight of Al atoms and 1 to 8 parts by weight of one or more rare earth elements selected from the group consisting of Sm, Nd, Y and Pr, per 100 parts by weight of Fe atoms, and the content ratio in the surface composition is 70 to 200 parts by number of Al atoms and 0.5 to 30 parts by number of atoms of said rare earth elements, per 100 parts by number of Fe atoms.

More preferably, the content ratio in the entire composition of the ferromagnetic metal powder is 2 to 10 parts by weight of Al atoms, 1 to 8 parts by weight of one or more rare earth elements selected from the group consisting of Sm, Nd, Y and Pt, less than 0.1 part by weight of Na atoms and 0.1 to 2 parts by weight of Ca atoms, per 100 parts by weight of Fe atoms, and the content ratio in the surface composition is 70 to 200 parts by number of Al atoms, 0.5 to 30 parts by number of atoms of said rare earth elements, 2 to 30 parts by number of Na atoms and 5 to 30 parts by number of Ca atoms, per 100 parts by number of Fe atoms.

Still more preferably, the content ratio in the entire composition of the ferromagnetic metal powder is 2 to 20 parts by weight of Co atoms, 2 to 20 parts by weight of Ni atoms, 2 to 10 parts by weight of Al atoms, 0.3 to 5 parts by weight of Si atoms, 1 to 8 parts by weight of atoms of one or more rare earth elements selected from the group consisting of Sm, Nd, Y and Pr, less than 0.1 part by weight of Na atoms and 0.1 to 2 parts by weight of Ca atoms, per 100 parts by weight of Fe atoms, and the content ratio in the surface composition is less than 0.1 part by number of Co atoms, less than 0.1 part by number of Ni atoms, 70 to 200 parts by number of Al atoms, 20 to 130 parts by number of Si atoms, 0.5 to 30 parts by number of atoms of said rare earth elements, 2 to 30 parts by number of Na atoms and 5 to 30 parts by number of Ca atoms, per 100 parts by number of Fe atoms.

Preference is given to a ferromagnetic metal powder wherein the content ratio of Fe, Co, Ni, Al, Si, one or more rare earth elements selected from the group consisting of Sm, Nd, Y and Pr, and Na and Ca in the entire composition and their content ratio in the surface composition fall within the ranges described above, because it has a high coercive force (Hc) of not lower than 1700 Oe, a high saturation magnetism (($\sigma_s$) of not lower than 120 emu/g and a high dispersibility.

The content of this ferromagnetic metal powder is normally 60 to 95% by weight, preferably 70 to 90% by weight, and more preferably 75 to 85% by weight of the total solid content in the layer.

In the present invention, the magnetic layer may contain two or more magnetic powders.

Other magnetic powders include a ferromagnetic iron oxide powder, a ferromagnetic iron powder and a hexagonal tabular powder.

Of these, the ferromagnetic metal powder described below is preferably used for the present invention.

The above-mentioned ferromagnetic iron oxide powder is exemplified by powders of $\gamma$-$Fe_2O_3$, $Fe_3O_4$, intermediate iron oxides thereof represented by $FeO_x$ (1.33<x<1.5) and Co-adduct compounds thereof represented by (cobalt-modified) Co-$FeO_x$ (1.33<x<1.5).

Examples of the ferromagnetic metal powder include ferromagnetic powders of Fe or Co, and magnetic metal powders based mainly on Fe, Ni or Co such as magnetic powders of Fe-Al alloy, Fe-Al-Ni alloy, Fe-Al-Zn alloy, Fe-Al-Co alloy, Fe-Al-Ca alloy, Fe-Ni alloy, Fe-Ni-Al alloy, Fe-Ni-Co alloy, Fe-Ni-Si-Al-Mn alloy, Fe-Ni-Si-Al-Zn alloy, Fe-Al-Si alloy, Fe-Ni-Zn alloy, Fe-Ni-Mn alloy, Fe-Ni-Si alloy, Fe-Mn-Zn alloy, Fe-Co-Ni-P alloy and Ni-Co alloy. Particularly, Fe-based metal powders are excellent in electric properties.

On the other hand, from the viewpoint of corrosion resistance and dispersibility, preference is given to Fe-Al-based ferromagnetic metal powders such as those of Fe-Al alloy, Fe-Al-Ca alloy, Fe-Al-Ni alloy, Fe-Al-Zn alloy, Fe-Al-Co alloy, Fe-Ni-Si-Al-Co alloy and Fe-Co-Al-Ca alloy.

In the present invention, it is preferable to use a ferromagnetic metal powder having a specific surface area of not lower than 30 $m^2$/g, particularly not lower than 45 $m^2$/g as measured by the BET method, depending on the degree of increase in recording density.

Specific surface area and methods of its measurement are described in detail in "Fine Particle Measurement," edited by J. M. Dallavelle and Clydeorr Jr., translated into Japanese by Muta et al., published by Sangyo Tosho, and in "Kagaku Binran Ooyo Hen," pp. 1170–1171 (edited by the Chemical Society of Japan, published by Maruzen Co., Ltd., Apr. 30, 1966).

Specific surface area is measured by, for example, degassing the subject powder with heat treatment at about 105° C. for 13 minutes to remove the substances adsorbed thereto, then introducing the powder into the measuring apparatus and carrying out adsorptiometry at a liquid nitrogen temperature (−105° C.) for 10 minutes at an initial nitrogen pressure of 0.5 kg/$m^2$.

For example, Quantasorb (produced by Yuasa Ionics Co., Ltd.) is used for this measurement.

The ferromagnetic metal powder preferably has the following structure: The content ratio of Fe atoms and Al atoms in the ferromagnetic metal powder is Fe:Al=100:1 to 100:20 by number of atoms, and the content ratio of Fe atoms and Al atoms in the surface region not deeper than 100 Å as of ESCA-analyzed depth is Fe:Al=30:70 to 70:30 by number of atoms. In another preferred mode of the ferromagnetic metal powder, Fe atoms, Ni atoms, Al atoms and Si atoms are contained in the ferromagnetic powder, at least either of Co atoms and Ca atoms are contained therein, the Fe atom content is not less than 90 atomic %, the Ni atom content is not less than 1 atomic % and less than 10 atomic %, the Al atom content is not less than 0.1 atomic % and less than 5 atomic %, the Si atom content is not less than 0.1 atomic % and less than 5 atomic %, the Co atom content and/or the Ca atom content (total content, in case where both Co and Ca atoms are contained) is not less than 0.1 atomic % and less than 13 atomic %, and the ratio of atoms distributed in the surface region not deeper than 100 Å as of ESCA-analyzed depth is Fe:Ni:Al:Si(Co and/or Ca)=100:not more than 4:10–60:10– 70:20–80 by number of atoms.

In the present invention, the axial ratio b/a of the major axis length (a) of the above ferromagnetic powder contained in the magnetic layer and the major axis length (b) of the nonmagnetic powder contained in the lower nonmagnetic layer is desirably not greater than 3, more desirably not greater than 2.5, and still more desirably not greater than 2. This is because when the axial ratio falls within this range, the magnetic recording medium have excellent properties such as good surface condition.

The upper magnetic layer of the magnetic recording medium of the present invention may incorporate a magnetic powder of hexagonal crystal grains.

Hexagonal magnetic powders include powders of barium ferrite and strontium ferrite.

A preferable hexagonal Ba-ferrite powder is a Ba-ferrite powder whose Fe has been partially replaced by Co and Zn and which has an average grain size (length of the diagonal line of the hexagonal ferrite tabular plane) of 300 to 900 Å, a tabular ratio (quotient obtained by dividing the length of the diagonal line of the hexagonal ferrite tabular plane by tabular thickness) of 2.0 to 10.0, preferably 2.o to 6.0 and a coercive force Hc of 450 to 1500.

Such Ba-ferrite powder has an appropriately controlled coercive force as a result of partial replacement of Fe with Co and a high saturation magnetism not obtained by Co replacement alone as a result of further partial replacement of Fe with Zn, thus offering a magnetic recording medium having a high reproduction output and an excellent electromagnetic transferring property. Also, partial replacement of Fe with Nb makes it possible to produce a magnetic recording medium having a higher reproduction output and an excellent electromagnetic transferring property. The Ba-ferrite for the present invention may have its Fe partially replaced with transition metals such as Ti, In, Mn, Cu, Ge and Sn.

The Ba-ferrite for the present invention is represented by the general formula:

$$(BaO)n((Fe_{1-m}M_m)_2O_3)$$

where m>0.36 (Co+Zn=0.08 to 0.3, Co/Zn=0.5 to 10); n is 5.4 to 11.0, preferably 5.4 to 6.0; M represents a replacing metal, preferably a combination of two or more magnetic metal elements having an average valency of 3.

The reason why it is preferable to limit the average grain size, tabular ratio and coercive force of the Ba-ferrite to the above ranges is as follows: For obtaining sufficient reproduction output from the magnetic recording medium, the average grain size of the Ba-ferrite is preferably not less than 300 Å; for improving surface smoothness and lowering noise level, the average grain size is preferably not more than 900 Å. Also, increasing the tabular ratio above 2.0 offers a vertical orientation rate suitable for high density recording for the magnetic recording medium; for improving surface smoothness and lowering noise level, the tabular ratio is preferably not more than 10.0. From the viewpoint of recording signal retention, the coercive force is preferably not less than 450 Oe; for preventing head saturation, the coercive force is preferably not more than 1500 Oe.

Usually, the barium ferrite magnetic powder for the present invention preferably has a saturation magnetism ($\sigma s$), a magnetic property, of not lower than 50 emu/g. This is because the electromagnetic transferring property can deteriorate if the saturation magnetism is lower than 50 emu/g.

In the present invention, it is also desirable to use a Ba-ferrite magnetic powder having a specific surface area of not less than 30 m$^2$/g, as determined by the BET method, according to the degree of increase in recording density.

For producing a hexagonal magnetic powder for the present invention, various methods are applicable, including the co-precipitation-burning method, the hydrothermal synthesis method, the flux method, the alkoxide method and the plasma jet method, as well as the glass crystallization method in which oxides or carbonates of elements necessary to form the desired Ba-ferrite are fused with a glass-forming material such as boric acid, the resulting flux is rapidly cooled to yield glass, which is then heated at a given temperature to yield crystalline powder of the desired Ba-ferrite, and the glass component is finally removed by heat treatment.

The ferromagnetic powder and/or hexagonal magnetic powder content in the magnetic layer is normally 50 to 99% by weight, preferably 60 to 99% by weight.

Lower layer

The lower layer has at least one layer containing a nonmagnetic powder or a ferromagnetic powder.

The lower layer may be configured with one or more layers, with preference given to a single layer.

In the present invention, a nonmagnetic powder meeting the above property requirements can be optionally selected from various known nonmagnetic powders for use in this kind of magnetic recording media. Examples of such nonmagnetic powders include powders of titanium oxide, barium sulfate, ZnS, MgCO$_3$, CaCO$_3$, ZnO, CaO, tungsten dioxide, molybdenum dioxide, boron nitride, MgO, SnO$_2$, SiO$_2$, Cr$_2$O$_3$, $\alpha$-Al$_2$O$_3$, SiC, cerium oxide, corundum, artificial diamond, $\alpha$-iron oxide, garnet, silicate, silicon nitride, silicon carbide, molybdenum carbide, boron carbide, tungsten carbide, titanium carbide, tripoli, diatomaceous earth and dolomite. Of these nonmagnetic powders, preference is given to inorganic powders such as those of CaCO$_3$, titanium oxide, barium sulfate, $\alpha$-Al$_2$O$_3$, $\alpha$-iron oxide and Cr$_2$O$_3$, and polymer powders such as those of polyethylene. Although the powder grains may have any form, whether needles, spheres or granules, a nonmagnetic powder of needle grains can be preferably used for the present invention. Using such needles of nonmagnetic powder offers improved surface smoothness of the nonmagnetic layer and improved surface smoothness of the uppermost magnetic layer formed thereon.

The major axis length of the nonmagnetic powder is normally not greater than 0.50 µm, preferably not greater than 0.40 µm, and more preferably not greater than 0.30 µm.

The minor axis length of the nonmagnetic powder is normally not greater than 0.10 µm, preferably not greater than 0.08 µm, and more preferably not greater than 0.06 µm.

The axial ratio of the nonmagnetic powder is normally 2 to 20, preferably 5 to 15, and more preferably 5 to 10. The axial ratio mentioned herein is defined as the ratio of the major axis length to the minor axis length (major axis length/minor axis length).

The specific surface area of the nonmagnetic powder is normally 10 to 250 m$^2$/g, preferably 20 to 150 m$^2$/g, and more preferably 30 to 100 m$^2$/g.

It is preferable to use a nonmagnetic powder whose major axis length, minor axis length, axial ratio and specific surface area fall within the above ranges, because the surface condition of the upper magnetic layer, as well as the surface condition of the nonmagnetic layer, can be improved.

In the present invention, it is preferable that the nonmagnetic powder be surface treated with an Si compound and/or an Al compound. This surface treatment can be achieved by the method described in Japanese Patent O.P.I. Publication No. 83219/1990. Using a nonmagnetic powder after such surface treatment offers a good surface condition for the uppermost magnetic layer. The Si and/or Al content is preferably 0.1 to 10% by weight of Si and 0.1 to 10% by weight of Al, relative to the nonmagnetic powder, more preferably 0.1 to 5% by weight of Si and 0.1 to 5% by weight of Al, with the weight ratio of Si and Al being not less than 3.

A method of determining the true specific gravity of inorganic powder is described on page 299 of "Shikizai Kogaku Handbook."

True specific gravity values of various inorganic powders are given on page 230 of the same publication.

For a good surface condition of the relevant layer, the grain size of the nonmagnetic powder is normally 1 to 300 nm, preferably 1 to 100 nm, and more preferably 1 to 50 nm.

The ferromagnetic powder is exemplified by the same examples of ferromagnetic powder as specified for the upper layer above.

The thickness of the lower layer is normally 0.5 to 4.0 µm, preferably 0.5 to 2.0 µm.

Binders

Binders used to form a magnetic and other layers are described below.

Binders incorporated in the magnetic and nonmagnetic layers of the present invention are typically exemplified by vinyl chloride resins such as polyurethane, polyester and vinyl chloride copolymers. These resins preferably contain repeat units having at least one polar radical selected from the group consisting of —SO$_3$M, —OSO$_3$M, —COOM and —PO(OM$^1$)$_2$.

With respect to the polar radicals, M represents a hydrogen atom or an alkali metal such as sodium, potassium or lithium, and M$^1$ represents a hydrogen atom, an alkali metal such as sodium, potassium or lithium or an alkyl group.

The polar radical improves the dispersibility of ferromagnetic powder, and its content in each resin is 0.1 to 8.0 mol %, preferably 0.5 to 6.0 mol %. If this content is lower than 0 1 mol % the dispersibility of ferromagnetic powder decreases; if it exceeds 8 0 mol % the magnetic coating compound becomes liable to gelation. The weight-average molecular weight of each resin described above is preferably 15,000 to 50,000.

The binder content is normally 8 to 25 parts by weight, preferably 10 to 20 parts by weight per 100 parts by weight of ferromagnetic metal powder.

These binders may be used singly or in combination of two or more kinds. In the latter case, the ratio of polyurethane and/or polyester and vinyl chloride resin is normally 90:10 to 10:90, preferably 70:30 to 30:70 by weight.

The vinyl chloride copolymer used as a binder for the present invention, which contains a polar radical, can be synthesized by addition reaction of a copolymer containing the hydroxyl group such as a vinyl chloride-vinyl alcohol copolymer, and one of the following compounds having a polar radical and a chlorine atom.

ClCH$_2$CH$_2$SO$_3$M

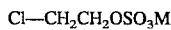Cl—CH$_2$CH$_2$OSO$_3$M

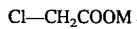Cl—CH$_2$COOM

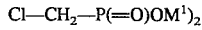Cl—CH$_2$—P(=O)OM$^1$)$_2$

Of these compounds, Cl—CH$_2$CH$_2$SO$_3$Na is taken as an example to explain the above reaction.

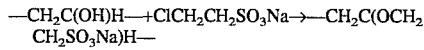—CH$_2$C(OH)H—+ClCH$_2$CH$_2$SO$_3$Na→—CH$_2$C(OCH$_2$CH$_2$SO$_3$Na)H—

It is also possible to obtain the desired vinyl chloride copolymer containing a polar radical by charging a reactor such as an autoclave with a given amount of a reactive monomer (having an unsaturated bond) to which a repeat unit containing a polar radical is introduced, and carrying out a polymerizing reaction using an ordinary polymerization initiator, e.g., a radical polymerization initiator such as BPO (benzoyl peroxide) or AIBN (azobisisobutyronitrile), a redox polymerization initiator or a cationic polymerization initiator.

Using this known method, a polyester having a polar radical (polyol) can be synthesized from polyol and a polybasic acid having a polar radical.

Examples of polybasic acids having a polar radical include 5-sulfoisophthalic acid, 2-sulfoisophthalic acid, 4-sulfoisophthalic acid, 3-sulfophthalic acid, dialkyl 5-sulfoisophthalate, dialkyl 2-sulfoisophthalate, dialkyl 4-sulfoisophthalate, dialkyl 3-sulfoisophthalate, sodium salts and potassium salts thereof.

Examples of polyol include trimethylolpropane, hexanetriol, glycerol, trimethylolethane, neopentyl glycol, pentaerythritol, ethylene glycol, propylene glycol, 1,3-butanediol, 1,4-butanediol, 1,6-hexanediol, diethylene glycol and cyclohexanedimethanol.

A polyester incorporating another polar radical can also be synthesized by a known method.

The synthesis of polyurethane is described below.

It is prepared by reaction of polyol and polyisocyanate.

The polyol used for this purpose is normally a polyester polyol obtained by reaction of polyol and polybasic acid.

It is therefore possible to synthesize a polyurethane having a polar radical by using a polyester polyol having a polar radical as a starting material.

Examples of polyisocyanate include diphenylmethane-4, 4'-diisocyanate (MDI), hexamethylene diisocyanate (HMDI), tolylene diisocyanate (TDI), 1,5-naphthalene diisocyanate (NDI), tolidine diisocyanate (TODI) and lysine isocyanate methyl ester (LDI).

As another method of synthesizing a polyurethane having a polar radical, an addition reaction of a polyurethane having the hydroxyl group and one of the following compounds having both a polar radical and a chlorine atom is effective.

Cl—CH$_2$CH$_2$SO$_3$M

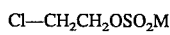Cl—CH$_2$CH$_2$OSO$_2$M

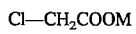Cl—CH$_2$COOM

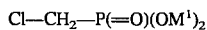Cl—CH$_2$—P(=O)(OM$^1$)$_2$

Introduction of a polar radical into polyurethane is described in Japanese Patent Examined Publication No. 41565/1983 and Japanese Patent O.P.I. Publication Nos. 92422/1982, 92423/1982, 8127/1984, 5423/1984, 5424/1984 and 121923/1987 and other publications. These methods may be used for the present invention.

In the present invention, the following resins can be used as binders in a ratio of not more than 50%, preferably not more than 20% by weight of the total binder content.

The resin is exemplified by vinyl chloride-vinyl acetate copolymer, vinyl chloride-vinylidene chloride copolymer, vinyl chloride-acrylonitrile copolymer, butadiene-acrylonitrile copolymer, polyamide resin, polyvinylbutyral, cellulose derivatives such as nitrocellulose, styrene-butadiene copolymer, phenol resin, epoxy resin, urea resin, melamine resin, phenoxy resin, silicone resin, acrylic resin, ureaformamide resin and various synthetic rubber resins, which resins have a weight-average molecular weight of 10,000 to 200,000. Examples of such resins are given in paragraph [0031] of Japanese Patent O.P.I. Publication Nos. 222921/1992.

(H-2-3) Other components

In the present invention, other components may be incorporated in the upper magnetic layer to improve its quality, including an abrasive, a lubricant, a durability improving agent, a dispersing agent, an antistatic agent and electromagnetic fine powder.

The abrasive may be a known substance such as the substance described in paragraph [0105] of Japanese Patent O.P.I. Publication No. 214218/1992.

The average particle size of the abrasive is normally 0.05 to 0.6 μm, preferably 0.05 to 0.5 μm, and more preferably 0.05 to 0.3 μm.

The content of the abrasive in the upper layer is normally 3 to 20 parts by weight, preferably 5 to 15 parts by weight, and more preferably 5 to 10 parts by weight.

Fatty acid and/or fatty acid ester can be used as a lubricant. In this case, the amount of fatty acid added is preferably 0.2 to 10% by weight, more preferably 0.5 to 5% by weight of the magnetic powder. If the addition amount is lower than 0.2% by weight, the running property becomes liable to deterioration; if it exceeds 10% by weight, the fatty acid oozes out on the magnetic layer surface and output reduction becomes more likely to occur.

The amount of fatty acid ester added is preferably 0.2 to 10% by weight, more preferably 0.5 to 5% by weight of the magnetic powder. If the amount of addition is lower than 0.2% by weight, the still durability becomes more liable to deterioration; if it exceeds 10% by weight, the fatty acid ester oozes out on the surface of magnetic layer and output reduction becomes more likely to occur.

For enhancing the lubricating effect by using fatty acid and fatty acid ester in combination, their weight ratio is preferably 10:90 to 90:10.

The fatty acid may be monobasic or dibasic, preferably having a carbon number of 6 to 30, more preferably 12 to 22.

Examples of fatty acids include caproic acid, caprylic acid, captic acid, lauric acid, myristic acid, palmitic acid, stearic acid, isostearic acid, linolenic acid, oleic acid, elaidic acid, behenic acid, malonic acid, succinic acid, maleic acid, glutaric acid, adipic acid, pimelic acid, azelaic acid, sebacic acid, 1,12-dodecanedicarboxylic acid and octanedicarboxylic acid, as described in paragraph [0102] of Japanese Patent O.P.I. Publication No. 214218/1992.

Examples of fatty acid esters include oleyl oleate, isocetyl stearate, dioleyl malate, butyl stearate, butyl palmitate, butyl myristate, octyl myristate, octyl palmitate, pentyl stearate, pentyl palmitate, isobutyl oleate, stearyl stearate, lauryl oleate, octyl oleate, isobutyl oleate, ethyl oleate, isotridecyl oleate, 2-ethylhexyl stearate, 2-ethylhexyl palmitate, isopropyl palmitate, isopropyl myristate, butyl laurate, cetyl-2-ethyl hexalate, dioleyl adipate, diethyl adipate, diisobutyl adipate, diisodecyl adipate, oleyl stearate, 2-ethylhexyl myristate, isopentyl palmirate, isopentyl stearate, diethylene glycol-mono-butyl ether palmirate and diethylene glycol-mono-butyl ether palmirate, as described in paragraph [0103] of Japanese Patent O.P.I. Publication No. 214218/1992.

In addition to the fatty acids and fatty acid esters mentioned above, known substances can be used as lubricants, such as silicone oil, carbon fluoride, graphite, molybdenum disulfide, tungsten disulfide, fatty acid amide and α-olefin oxide.

Examples of the hardener or durability improving agent described above include polyisocyanates, exemplified by aromatic polyisocyanates such as active hydrogen compound adducts of tolylene diisocyanate (TDI) and aliphatic polyisocyanates such as active hydrogen compound adducts of hexamethylene diisocyanate (HMDI). The weight-average molecular weight of the polyisocyanate is desirably within the range of 100–3,000.

Examples of the dispersing agent described above include fatty acids having a carbon number of 12 to 18 such as caprylic acid, captic acid, lauric acid, myristic acid, palmitic acid, stearic acid and oleic acid, alkali metal salts, alkaline earth metal salts or amides thereof, polyalkylene oxide alkylphosphates, lecithin, trialkylpolyolefin oxy-quaternary-ammonium salt, and azo compounds having a carboxyl group and/or a sulfonic acid group. These dispersing agents are used normally within the content ratio from 0.5 to 5% by weight of the ferromagnetic powder.

Examples of the antistatic agent described above include cationic surfactants such as quaternary amine, anionic surfactants containing an acid group such as sulfonic acid, sulfuric acid, phosphoric acid, phosphate and carboxylic acid, amphoteric surfactants such as aminosulfonic acid, and natural surfactants such as saponin, as described in paragraph [0107] of Japanese Patent O.P.I. Publication No. 214218/1992. The antistatic agent is added normally within the content range from 0.01 to 40% by weight of the binder.

The upper layer may be configured with two or more magnetic layers of 0.05 to 0.3 µm in thickness.

It is preferable to incorporate an electroconductive powder of 30 to 200 nm grain size in the upper layer and another electroconductive powder of 5 to 30 nm grain size in the lower layer.

To provide a magnetic recording medium which has improved surface smoothness, which is excellent in electric properties and running property and which is suitable for recording with a control signal, an interlayer may be formed between the upper and lower layers.

The magnetic recording medium of the present invention as having an interlayer is hereinafter described.

In this embodiment, the magnetic recording medium of the present invention has a lower layer (L) containing a ferromagnetic powder, an interlayer (M) containing a non-magnetic powder and/or a material of high magnetic permeability, and an upper layer (H) containing a magnetic powder, all formed in this order on a support (BF).

The nonmagnetic support (BF) is as described above.

The upper layer (H) containing a magnetic powder is basically the same as the above-described upper layer. It preferably has the following surface condition:

The surface roughness $R_{10z}$ of the upper layer containing a magnetic powder is normally not more than 50 nm, preferably not more than 30 nm, and more preferably 5 to 20 nm. When the surface roughness $R_{10z}$ is 5 to 20 nm, a good C/N ratio characteristic is obtained.

Surface roughness $R_{10z}$ is defined as the value for the distance d between two lines $L_1$ and $L_2$ measured in the longitudinal direction of the outer surface edge curve, two lines which are selected out of the lines parallel to the horizontal lines cutting the outer surface edge curve on the cross section obtained by vertically cutting the magnetic recording medium in a given length in the longitudinal direction within the range of ±2 mm (represented by R in FIG. 1) from transversal center point P, as passing the 10th highest crest and the 10th deepest valley, respectively, as illustrated in FIG. 1.

Surface roughness $R_{10z}$ is determined using a tarry step surface roughness tester (produced by Rank-Tailor-Hobson) with a stylus setting of 2.5×0.1 µm, a needle pressure of 2 mg, a cutoff filtering frequency of 0.33 Hz, a measuring speed of 2.5 µm/sec and a reference length of 0.5 mm. Ruggedness values of not less than 0.002 µm are excluded from the surface roughness curve.

$R_{10z}$ can be adjusted by setting appropriate calendering conditions for the production process to have a controlled surface smoothness of the magnetic layer. Temperature, linear pressure, C/S (coating speed) and other factors of calendering are to be controlled. Other factors such as the size and amount of grains added to the magnetic layer are controlled as necessary.

For accomplishing the object of the present invention, it is preferable to keep the above-described temperature at 50° to 140° C., the linear pressure at 50 to 400 kg/cm and the C/S at 20 to 1000 m/min. Failure to meet these numerical requirements can result in difficulty or even impossibility in keeping the magnetic layer surface roughness $R_{10z}$ within the above range.

A preferred ferromagnetic metal powder for the present invention is an Fe-Al ferromagnetic metal powder (Fe:Al weight ratio 100:5, average major axis length 0.16 μm, Hc 1580 Oe, σs 120 emu/g). Specifically, such material is exemplified by the same examples as specified for the upper layer of a double-layer magnetic recording medium above.

In the present invention, the axial ratio b/a of the major axis length (a) of the above-described ferromagnetic powder contained in the magnetic layer and the major axis length (b) of the nonmagnetic powder contained in the lower nonmagnetic layer is desirably not greater than 3, more desirably not greater than 2.5, and still more desirably not greater than 2. This is because when the axial ratio falls within this range, excellent properties are obtained, such as a good surface condition, for the magnetic recording medium.

The thickness of the upper layer is normally not more than 0.8 μm, preferably not more than 0.5 μm, and more preferably 0.02 to 0.4 μm. If the thickness is less than 0.01 μm, no sufficient output may be obtained at reproduction because of recording failure. If the thickness exceeds 0.7 μm, no sufficient reproduction output may be obtained due to layer thickness loss.

(M) Interlayer

The interlayer comprises at least one layer formed between the upper and lower layers on the nonmagnetic support.

The interlayer may be configured with a single layer or a combination of two or more layers. The interlayer is exemplified by a nonmagnetic layer containing a nonmagnetic powder (M-1), a layer containing a material of high magnetic permeability (M-2), a combination thereof and a layer containing both a nonmagnetic powder and a material of high magnetic permeability.

In the present invention, a nonmagnetic layer (M-1) is preferred, with greater preference given to a nonmagnetic layer containing a nonmagnetic powder of needle grains. Although it is also possible to form a filler-free interlayer comprising a binder and additives, in place of the above-described nonmagnetic layer containing a nonmagnetic powder (M-1) or layer containing a material of high magnetic permeability (M-2), it is preferable for the object of the present invention to use M-1 or M-2.

In any case, the interlayer preferably has a saturation magnetic flux density Bm of 5 to 1000 G, more preferably 600 to 1000 G. Provided that the saturation magnetic flux density falls within this range, the rheology property and recoatability of the interlayer coating compound improve. Control output also improves. However, if the ferromagnetic powder content in the interlayer exceeds the above range, the electromagnetic transferring property in high frequency bands can deteriorate due to self demagnetization.

It is also preferable that the interlayer be formed so that the weight ratio $A_1/B_1$ of ferromagnetic powder content $A_1$ to nonmagnetic powder and/or material of high magnetic permeability content $B_1$ is 99/1 to 50/50, more preferably 200/100 to 50/50 and so that the nonmagnetic powder has a true specific gravity of not less than 2.5. True specific gravity can be determined by the method described on page 229 of "Shikizai Kogaku Handbook." Provided that the ferromagnetic powder is incorporated in the interlayer as described above, the rheology property and recoatability of the interlayer coating compound improve. Control output also improves. However, if the ferromagnetic powder content in the interlayer exceeds the above range, the electromagnetic transferring property in high frequency bands can deteriorate due to self demagnetization.

The thickness of the interlayer is normally 0.1 to 2.5 μm, preferably 0.2 to 2.0 μm, and more preferably 0.5 to 2.0 μm. If this thickness exceeds 2.5 μm, what is called recoating surface roughness occurs, in which the upper layer surface roughness increases after recoating, which can hamper the obtainment of a preferred electromagnetic transferring property. If this thickness is less than 0.1 μm, high smoothness is difficult to obtain in calendering, which can deteriorate the electromagnetic transferring property and nullify the significance of formation of the interlayer.

(M-1) Nonmagnetic layer

The nonmagnetic layer contains a binder and other additives as necessary, as well as a nonmagnetic powder.

(M-1-1) Nonmagnetic powder

In the present invention, various known nonmagnetic powders can be chosen and used optionally as appropriate. Specifically, such nonmagnetic powders are exemplified by the same examples of nonmagnetic powder as specified for a double layer magnetic recording medium above.

The content of the nonmagnetic powder in the nonmagnetic layer is normally 50 to 99% by weight, preferably 60 to 95% by weight and more preferably 70 to 95% by weight to the total content of all components of the nonmagnetic layer. Provided that the nonmagnetic powder content falls within this range, the surface conditions of the upper magnetic layer and nonmagnetic layer can be improved.

(M-1-2) Binder

The binder contained in the nonmagnetic interlayer is exemplified by the same compounds as specified for the upper layer above. The amount of binder used is normally 5 to 150 parts by weight, preferably 10 to 120 parts by weight per 100 parts by weight of nonmagnetic powder.

(M-1-3) Other components

Other components of the nonmagnetic interlayer are exemplified by the same compounds as specified for (H-2-3) above. The amount of their use can be chosen as appropriate without limitation, as long as the object of the invention is not interfered with.

(M-2) Layer containing material of high magnetic permeability

The layer containing a material of high magnetic permeability contains a binder and other additives as necessary.

(M-2-1) Material of high magnetic permeability

The material of high magnetic permeability has a coercive force Hc of $0<Hc\leq 1.0\times 10^4$ (A/m), preferably $0<Hc\leq 5.0\times 10^3$ (A/m). Provided that the coercive force falls within this range, the material of high magnetic permeability serves well to stabilize the magnetized region in the uppermost layer. Coercive forces exceeding the above range are undesirable because magnetic material nature can hampers the obtainment of the desired properties.

In the present invention, it is preferable to choose as appropriate a material of high magnetic permeability whose coercive force falls within the above range. Such materials of high magnetic permeability include soft magnetic metal materials and soft magnetic oxide materials.

Such soft magnetic metal materials include Fe-Si alloy, Fe-Al alloy (Alperm, Alfenol, Alfer), Permalloys (Ne-Fe-based binary alloy, multiple alloys resulting from addition of Mo, Cu, Cr, etc. to Ni-Fe-based binary alloy), Sendast (Fe-Si-Al in a ratio of 9.6% by weight of Si, 5.4% by weight of Al and the remaining % by weight of Fe), and Fe-Co alloy. Of these soft magnetic metal materials, Sendast is preferred. The soft magnetic metal material as a material of high magnetic permeability is exemplified by, but not limited to, the above examples. Such materials of high magnetic permeability may be used singly or in combination.

Examples of the above-described soft magnetic oxide material include spinel type ferrites such as $MnFe_2O_4$, $Fe_3O_4$, $CoFe_2O_4$, $NiFe_2O_4$, $MgFe_2O_4$ and $Li_{0.5}Fe_{2.5}O_4$, Mn-Za ferrite, Ni-Zn ferrite, Ni-Cu ferrite, Cu-Zn ferrite, Mg-Zn ferrite and Li-Zn ferrite, with preference given to Mn-Zn ferrite and Ni-Zn ferrite. These soft magnetic oxide materials may be used singly or in combination.

The material of high magnetic permeability is preferably milled to a fine powder having a particle size of 1 mµ to 1000 mµ, preferably 1 mµ to 500 mµ, and more preferably 1 mµ to 50 mµ, using a ball mill or another mill. Such fine powder can be obtained by spraying a fused alloy in a vacuum in the case of soft magnetic metal materials. In the case of soft magnetic oxide materials, they can be milled to a fine powder by such methods as the glass crystallization method, the co-precipitation burning method, the hydrothermal synthesis method, the flux method, the alkoxide method and the plasma jet method.

The content of material of high magnetic permeability in the layer containing it is normally 10 to 95% by weight, preferably 50 to 95% by weight, and more preferably 60 to 90% by weight. Provided that the content of material of high magnetic permeability falls within this range, uppermost layer magnetization is sufficiently stabilized. Contents of high magnetic permeability material of lower than 50% by weight are undesirable because it is sometimes impossible to obtain the desired effect of high magnetic permeability layer.

The layer containing a material of high magnetic permeability may contain nonmagnetic particles.

(M-2-2) Binder

The binder contained in the interlayer containing a material of high magnetic permeability is exemplified by the same compounds as specified for H-2-2 above. Its content is normally 5 to 30 parts by weight, preferably 10 to 25 parts by weight per 100 parts by weight of the material of high magnetic permeability.

(M-2-3) Other components

Other components contained in the interlayer containing a material of high magnetic permeability are exemplified by the same compounds as specified for H-2-3 above. Their content can be optionally chosen as appropriate without limitation, as long as the accomplishment of the object of the present invention is not interfered with.

(L-1) Lower layer

The lower magnetic layer contains a binder and other components as necessary, as well as a magnetic powder. The thickness of the lower layer is normally 0.5 to 5.0 µm, preferably 1.0 to 3.0 µm, and more preferably 1.5 to 2.5 pm.

(L-1-1) Magnetic powder

Preferable magnetic powders for containment in the lower magnetic layer are exemplified by the same compounds as specified for the upper layer above. These magnetic powders may be used singly or in combination.

Of these magnetic powders, Co-containing iron oxide powders and γ-iron oxide powders are preferred. Provided that the lower magnetic layer contains a Co-containing iron oxide powder or γ-iron oxide powder, reproduction output in bands of great recording wavelength, particularly those of recording wavelengths of not less than 30 MHz, improves, thus offering sufficient control signal output.

The magnetic powder content is normally 70 to 90% by weight, preferably 75 to 85% by weight per total solid content in the layer.

The coercive force of the lower magnetic layer is normally 300 to 1200 Oe, preferably 400 to 1000 Oe, and more preferably 600 to 900 Oe.

A key to the present invention is that the coercive force of the lower magnetic layer is lower than that of the upper magnetic layer. This is preferable because control output improves. The coercive force of the lower magnetic layer can be controlled to meet this requirement by choosing a magnetic powder with an appropriate coercive force for the lower layer.

(L-1-2) Binder

The binder contained in the lower magnetic layer may be a compound specified for the upper layer, its content being normally 5 to 25 parts by weight, preferably 10 to 20 parts by weight per 100 parts by weight of the ferromagnetic metal powder.

(L-1-3) Other components

Other components contained in the lower magnetic layer are exemplified by the same compounds as specified for the upper layer (H-2-3) above. Their content can be optionally chosen as appropriate without limitation, as long as the accomplishment of the object of the present invention is not interfered with.

Production of magnetic recording medium

The magnetic recording medium of the present invention is preferably produced by the wet-on-wet method, in which the magnetic layer and interlayer are coated while the lower layer remains in a wet state. For this wet-on-wet method, procedures for production of known magnetic recording medium of multiple layer structure can be used as appropriate.

For example, it is common practice to knead a magnetic powder, a binder, a dispersing agent, a lubricant, an abrasive, an antistatic agent and other additives and a solvent to prepare a dense magnetic coating compound, which is then diluted to yield a dilute magnetic coating compound, which is then coated on the surface of the nonmagnetic support.

Examples of the solvent include ketones such as acetone, methyl ethyl ketone (MEK), methyl isobutyl ketone (MIBK) and cyclohexanone, alcohols such as methanol, ethanol and propanol, esters such as methyl acetate, ethyl acetate and butyl acetate, cyclic ethers such as tetrahydrofuran and halogenated hydrocarbons such as methylene chloride, ethylene chloride, carbon tetrachloride, chloroform and dichlorobenzene, as described in paragraph [0119] of Japanese Patent O.P.I. Publication No. 214218/1992.

In kneading and dispersing the magnetic layer forming components, various kneaders can be used.

Examples of the kneader for this purpose include the double-roll mill, triple-roll mill, ball mill, pebble mill, cobble mill, Tron mill, sand mill, sand grinder, Sqegvari attriter, high speed impeller disperser, high speed stone mill, high speed impact mill, disper kneader, high speed mixer, homogenizer, ultrasonic disperser, open kneader, continuous kneader and pressure kneader. Of these kneaders, the pressure kneader, open kneader, continuous kneader, double-roll mill and triple-roll mill are capable of offering a power consumption load of 0.05 to 0.5 KW (per kg magnetic powder).

Examples of the solvent contained in the above coating compounds or the diluent used to coat the coating compounds include ketones such as acetone, methyl ethyl ketone, methyl isobutyl ketone and cyclohexanone, alcohols such as methanol, ethanol, propanol and butanol, esters such as methyl acetate, ethyl acetate, butyl acetate, ethyl tactate and ethylene glycol monoacetate, ethers such as glycol dimethyl ether, glycol monoethyl ether, dioxane and tetrahydrofuran, aromatic hydrocarbons such as benzene, toluene and xylene, and halogenated hydrocarbons such as methylene chloride, ethylene chloride, carbon tetrachloride, chloroform and dichlorobenzene, as described in paragraph [0119] of Japanese Patent O.P.I. Publication No. 214218/1992. These solvents may be used singly or in combination.

The magnetic field of the orientation magnet or vertical orientation magnet is about 20 to 10000 Gauss. The drier is operated at about 30° to 120° C. for about 0.1 to 10 minutes.

The multiple-layered magnetic recording medium of the present invention is preferably coated by the wet-on-wet method.

In the wet-on-wet method, the combination of a reverse roll and an extrusion coater, the combination of a gravure roll and an extrusion coater and other combinations can also be used. Also, an air doctor coater, a blade coater, an air knife coater, a squeeze coater, an impregnation coater, a transfer roll coater, a kiss coater, a cast coater, a spray coater, etc. can also be used in combination.

In multiple layer coating by the wet-on-wet method, the lower layer surface (interface with the uppermost layer) is smooth, the uppermost layer surface condition is good and adhesion between the upper and lower layers improves because the upper magnetic layer is coated while the lower layer remains in a wet state. This meets the requirements of high output and low noise for high density recording, e.g., the performance requirements for a magnetic tape, and durability is sufficient as a result of elimination of layer peeling and improved layer strength. Also, the wet-on-wet multiple coating method offers reduced dropouts and improved reliability.

Surface smoothing

In the present invention, surface smoothing by calendering is preferable.

This surface smoothing treatment may be followed by a varnish treatment or blade treatment as necessary, and subsequent slitting.

Calendering factors adjusted for surface smoothing include temperature, linear pressure and C/s (coating speed).

In the present invention, it is preferable to keep the above-described temperature at 50° to 140° C. the linear pressure at 50 to 400 kg/cm and the C/s at 20 to 1000 m/min. The thickness of the uppermost layer is thereby decreased below 0.5 μm, aspect preferable to improve the high frequency band property and signal overwrighting property.

The present invention provides a magnetic recording medium which is excellent in surface smoothness, electric properties and running property and which is suitable for recording media with a control signal.

EXAMPLES

The present invention is hereinafter described in more detail by means of the following examples. Examples 1 through 27 are magnetic recording media having no interlayers.

Example 1

The starting components for an uppermost layer magnetic coating compound and a lower layer magnetic coating compound, having the following compositions, were kneaded and dispersed using a kneader and a sand mill, to yield an uppermost layer magnetic coating compound and a lower layer magnetic coating compound.

A coating compound prepared as shown in Table 1 was coated on a polyethylene terephthalate film of 10 μm thickness by the wet-on-wet method. While the coating remained in a wet state, the film was subjected to a magnetism orientation treatment and then dried, followed by calendering for surface smoothing, to yield a magnetic layer consisting of a lower layer and uppermost layer whose thicknesses are listed in Table 1.

Uppermost layer magnetic coating compound

| | |
|---|---|
| Fe—Al—Ca ferromagnetic metal powder A<br>Fe:Al:Ca = 100:5:1 (weight ratio), (Hc 1750 Oe, BET<br>55 m$^2$/g, average major axis length 0.14 μm, crystallite<br>size 140 Å, axial ratio 8, σs 125 emu/g) | 100 parts |
| Vinyl chloride resin containing potassium sulfonate<br>(MR110, produced by Nippon Zeon Co., Ltd.) | 10 parts |
| Polyurethane containing sodium sulfonate (UR-8700,<br>produced by Toyobo Co., Ltd.) | 10 parts |
| Carbon black (average grain size 30 nm) | 1 part |
| (α-alumina (average grain size 0.2 μm) | 8 parts |
| Stearic acid | 1 part |
| Butyl stearate | 1 part |
| Cyclohexanone | 100 parts |
| Methyl ethyl ketone | 100 parts |
| Toluene | 100 parts |
| Lower layer coating compound | |
| Nonmagnetic powder A<br>(α-Fe$_2$O$_3$ (needle, axial ratio 8, BET 40 m$^2$/g, true<br>specific gravity 5.0, Si content per α-Fe$_2$O$_3$ 0.9 wt %,<br>Al content per α-Fe$_2$O$_3$ 0.1 wt %) | 80 parts |
| Ferromagnetic powder B<br>Co-γ-Fe$_2$O$_3$ (Hc 700 Oe, BET 45 m$^2$/g) | 20 parts |
| Vinyl chloride resin containing potassium sulfonate<br>(MR110, produced by Nippon Zeon Co., Ltd.) | 11 parts |
| Polyurethane containing sodium sulfonate (UR-8700,<br>produced by Toyobo Co., Ltd.) | 9 parts |
| α-alumina (average grain size 0.2 μm) | 5 parts |
| Carbon black (average grain size 20 nm) | 10 parts |
| Stearic acid | 1 part |
| Butyl stearate | 1 part |
| Cyclohexanone | 100 parts |

-continued

| | |
|---|---|
| Methyl ethyl ketone | 100 parts |
| Toluene | 100 parts |

To each of the thus-obtained uppermost layer magnetic coating compound and lower layer coating compound, 5 parts of a polyisocyanate compound (Coronate L, produced by Nippon Polyurethane Industry Co., Ltd.) was added.

A coating compound of the following composition was coated on the opposite face (back face) of the polyethylene terephthalate film, followed by drying and calendering under the above-described conditions, to form a back coating layer of 0.8 μm thickness to yield a wide bulk magnetic tape.

| Back coating layer | |
|---|---|
| Carbon black (Raven 1035) | 40 parts |
| Barium sulfate (average particle size 300 nm) | 10 parts |
| Nitrocellulose | 25 parts |
| Polyurethane resin (N-2301, produced by Nippon Polyurethane Co., Ltd.) | 25 parts |
| Polyisocyanate compound (Coronate L, produced by Nippon Polyurethane Co., Ltd.) | 10 parts |
| Cyclohexanone | 400 parts |
| Methyl ethyl ketone | 250 parts |
| Toluene | 250 parts |

The thus-obtained original magnetic tape was slit to yield an 8-mm wide magnetic recording medium for video recording.

This magnetic recording medium was evaluated as follows:
The results are given in Tables 2 and 5.

TABLE 2

| Sample | RF Output (dB) | Running Durability | Still frame Durability (min) | Coating Deffect (Streaks) | Thickness distribution Y* | Thickness distribution X* |
|---|---|---|---|---|---|---|
| Inv. 1 | 2.8 | A | 120 | 0 | 0.1 | 0.1 |
| Inv. 2 | 3.0 | A | 120 | 0 | 0.1 | 0.05 |
| Inv. 3 | 3.0 | A | 120 | 0 | 0.1 | 0.05 |
| Inv. 4 | 2.8 | A | 120 | 0 | 0.1 | 0.1 |
| Inv. 5 | 2.7 | A | 120 | 0 | 0.1 | 0.05 |
| Inv. 6 | 3.0 | A | 120 | 0 | 0.1 | 0.1 |
| Inv. 7 | 2.6 | A | 120 | 0 | 0.1 | 0.1 |
| Inv. 8 | 2.6 | A | 120 | 1 | 0.2 | 0.2 |
| Inv. 9 | 2.7 | A | 120 | 1 | 0.2 | 0.15 |
| Inv. 10 | 2.5 | A | 120 | 2 | 0.2 | 0.15 |
| Inv. 11 | 3.0 | A | 120 | 1 | 0.15 | 0.1 |
| Inv. 12 | 3.0 | A | 120 | 0 | 0.1 | 0.1 |
| Inv. 13 | 2.6 | A | 120 | 2 | 0.2 | 0.15 |
| Com. 1 | 3.0 | A | 110 | 7 | 0.3 | 0.2 |
| Com. 2 | 2.5 | B | 80 | 10 | 0.4 | 0.3 |
| Com. 3 | 2.8 | B | 70 | 10 | 0.4 | 0.3 |
| Com. 4 | 1.0 | D | 50 | 1 | 0.1 | 0.1 |
| Com. 5 | 1.2 | C | 50 | 0 | 0.1 | 0.1 |
| Com. 6 | 0.5 | C | 30 | 2 | 0.2 | 0.2 |
| Com. 7 | 0.8 | C | 40 | 2 | 0.3 | 0.2 |
| Com. 8 | 1.2 | B | 60 | 1 | 0.2 | 0.15 |
| Com. 9 | 1.5 | B | 60 | 1 | 0.15 | 0.1 |
| Com. 10 | 1.0 | C | 50 | 1 | 0.15 | 0.15 |

*Y: Longitudinal direction
X: Latitudinal direction

Methods of evaluation

TABLE I

| | Uppermost layer | | Lower layer | | | | | | | | |
|---|---|---|---|---|---|---|---|---|---|---|---|
| | | | Non magnetic powder (A) | | | | Ferromagnetic powder (B) | | | | |
| Example No. | Feromagnetic powder | Thickness (μm) | Species | Real specific gravity | Axis ratio | BET (cm$^2$/g) | Species | Hc (Oe) | Weight ratio (A)/(B) | Bm (Gauss) | Hc (Oe) | Thickness |
| Inv. 1 | A | 0.2 | α-Fe$_2$O$_3$ | 5.0 | 8 | 40 | Co-γ-Fe$_2$O$_3$ | 700 | 80/20 | 250 | 650 | 2.0 |
| Inv. 2 | A | 0.2 | α-Fe$_2$O$_3$ | 5.0 | 10 | 42 | Co-γ-Fe$_2$O$_3$ | 800 | 80/20 | 220 | 730 | 1.5 |
| Inv. 3 | A | 0.5 | α-Fe$_2$O$_3$ | 4.9 | 10 | 40 | Co-γ-Fe$_2$O$_3$ | 800 | 80/20 | 250 | 750 | 2.0 |
| Inv. 4 | A | 0.3 | α-Fe$_2$O$_3$ | 4.9 | 10 | 40 | Co-γ-Fe$_2$O$_3$ | 800 | 80/20 | 200 | 725 | 1.0 |
| Inv. 5 | A | 0.3 | α-Fe$_2$O$_3$ | 5.0 | 8 | 38 | Co-γ-Fe$_2$O$_3$ | 700 | 60/40 | 550 | 670 | 2.0 |
| Inv. 6 | A | 0.3 | α-Fe$_2$O$_3$ | 5.0 | 8 | 40 | Co-γ-Fe$_2$O$_3$ | 700 | 95/5 | 60 | 600 | 2.0 |
| Inv. 7 | A | 0.3 | α-Fe$_2$O$_3$ | 5.0 | 8 | 40 | Co-γ-Fe$_2$O$_3$ | 900 | 55/45 | 900 | 860 | 2.0 |
| Inv. 8 | A | 0.2 | TiO$_2$ | 4.0 | 10 | 35 | Co-γ-Fe$_2$O$_3$ | 700 | 80/20 | 230 | 640 | 2.0 |
| Inv. 9 | A | 0.3 | TiO$_2$ | 4.2 | 1 | 38 | Co-γ-Fe$_2$O$_3$ | 700 | 80/20 | 240 | 650 | 2.0 |
| Inv. 10 | A | 0.3 | TiO$_2$ | 4.2 | 1 | 38 | Co-γ-Fe$_2$O$_3$ | 800 | 60/40 | 260 | 770 | 1.5 |
| Inv. 11 | A | 0.3 | α-FeOOH | 4.0 | 6 | 100 | Co-γ-Fe$_2$O$_3$ | 700 | 80/20 | 250 | 650 | 1.5 |
| Inv. 12 | A | 0.3 | α-FeOOH | 4.2 | 10 | 150 | Co-γ-Fe$_2$O$_3$ | 700 | 60/40 | 260 | 670 | 1.5 |
| Inv. 13 | A | 0.3 | Cr$_2$O$_3$ | 5.0 | 5 | 20 | Co-γ-Fe$_2$O$_3$ | 800 | 70/30 | 420 | 760 | 2.0 |
| Com. 1 | A | 0.2 | α-Fe$_2$O$_3$ | 5.0 | 8 | 40 | — | — | 100/0 | 0 | 0 | 2.0 |
| Com. 2 | A | 0.2 | TiO$_2$ | 4.0 | 10 | 35 | — | — | 100/0 | 0 | 0 | 2.0 |
| Com. 3 | A | 0.2 | TiO$_2$ | 4.2 | 1 | 40 | — | — | 100/0 | 0 | 0 | 2.0 |
| Com. 4 | A | 0.3 | — | — | — | — | Co-γ-Fe$_2$O$_3$ | 700 | 0/100 | 1600 | 670 | 2.2 |
| Com. 5 | A | 0.3 | — | — | — | — | Co-γ-Fe$_2$O$_3$ | 800 | 0/100 | 1620 | 760 | 2.1 |
| Com. 6 | A | 0.3 | Carbon black | 1.9 | 1 | 100 | Co-γ-Fe$_2$O$_3$ | 700 | 70/30 | 360 | 650 | 2.0 |
| Com. 7 | A | 0.5 | Carbon black | 2.0 | 1 | 75 | Co-γ-Fe$_2$O$_3$ | 700 | 80/20 | 340 | 640 | 2.0 |
| Com. 8 | A | 0.3 | α-Fe$_2$O$_3$ | 5.0 | 10 | 40 | Co-γ-Fe$_2$O$_3$ | 700 | 40/60 | 1200 | 670 | 2.0 |
| Com. 9 | A | 0.3 | α-Fe$_2$O$_3$ | 5.0 | 10 | 40 | Co-γ-Fe$_2$O$_3$ | 700 | 20/80 | 1450 | 670 | 1.5 |
| Com. 10 | A | 0.3 | TiO$_2$ | 4.0 | 10 | 35 | Co-γ-Fe$_2$O$_3$ | 700 | 40/60 | 1150 | 670 | 2.0 |

1) Electric properties (dB), RF output

Using the 8-mm video camera CCDV-900, produced by Sony Corporation, RF output (dB) was determined at 7 MHz.

2) Running durability

Rerunning durability was tested in cycles of running at 40° C. temperature and 80% humidity and evaluated on the following criteria:

A: No problems

B: Back face flaws

C: Running seen but dropout often exceeded 50.

D: Running seen but electric property reduction of 2 dB or more

E: Running discontinued

3) Still frame durability

Using an 8-mm video camera EV-S900, produced by Sony Corporation, time to a decline of 2 dB in RF output in the still mode was determined in minute unit.

4) Coating streaks

The number of coating streaks during 1000 m coating was counted.

5) Layer thickness distributions, longitudinal and latitudinal

Layer thickness was measured over longitudinal 5 m and latitudinal 10 cm at equal intervals, using a contact thickness meter, and the variation was evaluated for each direction.

Overall composition

The content ratios of Fe, Co, Ni, Nd, Si and Al in the overall composition of the ferromagnetic metal powder were calculated by the fundamental parameter method (hereinafter referred to as the FP method) after the X-ray fluorescence intensity of each element was determined using a wavelength dispersion type X-ray fluorometer (WDX).

The FP method is described below.

X-ray fluorometry was conducted using the WDX system 3080, produced by Rigaku Denki K.K., under the conditions shown below.

X-ray bulb: Rhodium bulb

Output: 50 KV, 50 mA

Spectral crystals: LiF (for Ee, Co, Ni and Nd), PET (for Al), RX-4 (for Si)

Absorber: 1/1 (1/10 for Fe alone)

Slit: COARSE

Filter: OUT

PHA: 15 to 30 (for Al and Si), 10 to 30 (for Fe, Co, Ni and Nd)

Counting time: peak=40 seconds, background=40 seconds (measured at two points around the peak)

This instrument is not limitative; various X-ray fluorometers can be used.

Four metal compounds were used as standard samples as follows:

Standard sample 1 was SRM 1219, an alloy produced by Analytical Reference Materials International Company (0.15% C, 0.42% Mn, 0.03% P, 0.55% Si, 0.16% Cu, 2.16% Ni, 15.64% Cr, 0.16% Mo, 0.06% V, by weight).

Standard sample 2 was SRM 1250, an alloy produced by Analytical Reference Materials International Company (37.78% Ni, 0.08% Cr, 0.01% Mo, 16.10% Co, 0.99% Al, by weight).

Standard sample 3 was a magnetic iron oxide powder (0.14% Mn, 0.15% P, 0.19% S, 0.36% Si, 3.19% Co, 1.26% Zn, 0.07% Ca, 0.02% Na, by weight).

Standard sample 4 was a ferromagnetic metal powder (2.73% Nd by weight).

The weight percent values for the elements in standard samples 1 and 2 are from data sheets supplied by the manufacturer, those in standard samples 3 and 4 are analytical values obtained with an ICP light emission analyzer. These figures were input as the elemental analytical composition of the standard sample for the calculation by the FP method as follows:

Calculations by the FP method were made using the fundamental parameter software Version 2.1, produced by Technos, under the following conditions:

Model sample: Bulk sample

Balanced component sample: Fe

Input component: Found X-ray intensity (KCPS)

Analytical unit: % by weight

The content ratio of each element (% by weight) was obtained relative to the weight of Fe atoms.

Surface composition

The content ratios of Fe, Co, Ni, Nd, Si and Al in the surface composition of the ferromagnetic metal powder were obtained using an XPS surface analyzer.

The analytical procedure employed is described below.

The XPS surface analyzer was set to the following conditions:

X-ray anode: Mg

Resolution: 1.5 to 1.7 eV (defined as the half-value width of the 3d5/2 peak of clear Ag)

No adhesive tapes were used to fix the sample. Although various types of XPS surface analyzer can be used, the ESCALAB-200R of VG Company was used herein.

Narrow scans were conducted over the measuring range shown below to obtain the spectra of respective elements. Data intake interval was set at 0.2 eV, and data were integrated until the minimum count shown in Table 3 was obtained.

For the spectrum thus obtained, energy position was corrected to have a C peak at 284.6 eV.

Next, to process data on the COMMON DATA PROCESSING SYSTEM Vet. 2.3 produced by VAMAS-SCA-Japan (hereinafter referred to as the VAMAS software), each of the above spectra was transferred to a computer on which the VAMAS software is available, using a software supplied by the instrument manufacturer.

After the transferred spectrum was converted into data in the VAMAS format, using the VAMAS software, the data were processed as follows:

Before quantitative processing, the count scale was calibrated for each element for 5-point smoothing.

The quantitative processing was conducted as follows.

With the peak position of each element as the center, peak area intensity was determined over the quantitation range given in Table 4. Next, percent atomic number of each element was calculated, using the coefficient of sensitivity given in Table 4, relative to the number of Fe atoms.

Examples 14 through 25

Samples were prepared in the same manner as in Example 1, except that ferromagnetic metal powder A in the upper layer was replaced with sample Nos. 1 through 12 (spindle form) listed in Table 3 and 55 parts by weight of nonmagnetic powder A and 45 parts by weight of ferromagnetic powder B were used in the lower layer coating compound. The results are given below.

TABLE 3

| Sample | Content as a whole | | | | | | | | Surface Content | | | | | | | | Hc (Oe) | Major axis length (μm) | BET (m²/g) |
|---|---|---|---|---|---|---|---|---|---|---|---|---|---|---|---|---|---|---|---|
| | Fe | Rare earth | Al | Na | Ca | Co | Ni | Si | Fe | Rare earth | Al | Na | Ca | Co | Ni | Si | | | |
| 1 | 100 | Nd 4 | 6 | 0.001 | 0.3 | 0 | 0 | 0 | 100 | Nd 15 | 180 | 20 | 10 | 0 | 0 | 0 | 1700 | 0.15 | 53 |
| 2 | 100 | Sm 5 | 4 | 0.08 | 0.1 | 2 | 1 | 0.5 | 100 | Sm 25 | 120 | 30 | 12 | 0 | 3 | 20 | 1750 | 0.16 | 50 |
| 3 | 100 | Y 3 | 2 | 0.005 | 2.0 | 1 | 20 | 4 | 100 | Y 10 | 80 | 23 | 30 | 0 | 0.01 | 130 | 1650 | 0.17 | 51 |
| 4 | 100 | Pr 1 | 10 | 0.01 | 1.0 | 20 | 7 | 2 | 100 | Pr 3 | 180 | 27 | 25 | 0.01 | 0 | 80 | 1700 | 0.15 | 55 |
| 5 | 100 | Nd 3 | 4 | 0.0001 | 0.5 | 6 | 3 | 2 | 100 | Nd 10 | 100 | 10 | 10 | 0 | 0 | 50 | 1900 | 0.11 | 56 |
| 6 | 100 | Nd 4 | 4 | 0.0003 | 0.5 | 13 | 4 | 2 | 100 | Nd 15 | 95 | 15 | 13 | 0 | 0 | 70 | 2000 | 0.09 | 56 |
| 7 | 100 | Nd 3 | 6 | 0.0005 | 0.7 | 8 | 2 | 1 | 100 | Nd 30 | 110 | 16 | 18 | 0 | 0 | 40 | 2000 | 0.06 | 62 |
| 8 | 100 | Nd 4 | 4 | 0.0006 | 0.6 | 6 | 3 | 2 | 100 | Nd 10 | 100 | 3 | 6 | 20 | 0 | 25 | 1800 | 0.16 | 52 |
| 9 | 100 | Nd 3 | 4 | 0.0001 | 0.5 | 6 | 3 | 2 | 100 | Nd 35 | 100 | 10 | 0 | 0 | 0 | 50 | 1700 | 0.16 | 54 |
| 10 | 100 | Nd 4 | 4 | 0.0003 | 0.5 | 13 | 4 | 2 | 100 | Nd 0.3 | 95 | 15 | 13 | 2 | 0 | 70 | 1600 | 0.13 | 56 |
| 11 | 100 | Nd 0.3 | 5 | 0.002 | 0.5 | 4 | 4 | 1 | 100 | Nd 1 | 95 | 15 | 20 | 0.1 | 0 | 20 | 1650 | 0.17 | 50 |
| 12 | 100 | Nd 10 | 3 | 0.04 | 0.8 | 6 | 4 | 2 | 100 | Nd 45 | 70 | 40 | 30 | 0 | 0 | 50 | 1700 | 0.16 | 52 |

Examples 26 and 27

Samples were prepared in the same manner as in Example 1, except that ferromagnetic metal powder A in the upper layer was replaced with 100 parts by weight of a C-Ti barium ferrite (Hc 1120 Oe, BET value 45 m²/g, σs 64.2, tabular ratio, grain size 0.05 μm), and that the weight ratio of nonmagnetic powder (A) and ferromagnetic powder (B) in the lower layer were changed as shown in Table 4.

The results are given below.

TABLE 4

| Example No. | Uppermost layer | | | | | | Lower layer | | | | |
|---|---|---|---|---|---|---|---|---|---|---|---|
| | Ferromagnetic powder | Thickness (μm) | Non magnetic powder (A) | Real specific gravity | Axis ratio | BET (cm²/g) | Species | Hc (Oe) | Weight ratio (A)/(B) | Bm (Gauss) | Hc (Oe) | Thickness (μm) |
| 14 | Sample-1 | 0.2 | α-Fe₂O₃ | 5.0 | 8 | 55 | Co-γ-Fe₂O₃ | 800 | 55/45 | 850 | 800 | 1.5 |
| 15 | Sample-2 | 0.2 | α-Fe₂O₃ | 5.0 | 8 | 55 | Co-γ-Fe₂O₃ | 800 | 55/45 | 850 | 800 | 1.5 |
| 16 | Sample-3 | 0.2 | α-Fe₂O₃ | 5.0 | 8 | 55 | Co-γ-Fe₂O₃ | 800 | 55/45 | 850 | 800 | 1.5 |
| 17 | Sample-4 | 0.2 | α-Fe₂O₃ | 5.0 | 8 | 55 | Co-γ-Fe₂O₃ | 800 | 55/45 | 850 | 800 | 1.5 |
| 18 | Sample-5 | 0.2 | α-Fe₂O₃ | 5.0 | 8 | 55 | Co-γ-Fe₂O₃ | 800 | 55/45 | 850 | 800 | 1.5 |
| 19 | Sample-6 | 0.2 | α-Fe₂O₃ | 5.0 | 8 | 55 | Co-γ-Fe₂O₃ | 800 | 55/45 | 850 | 800 | 1.5 |
| 20 | Sample-7 | 0.2 | α-Fe₂O₃ | 5.0 | 8 | 55 | Co-γ-Fe₂O₃ | 800 | 55/45 | 850 | 800 | 1.5 |
| 21 | Sample-8 | 0.2 | α-Fe₂O₃ | 5.0 | 8 | 55 | Co-γ-Fe₂O₃ | 800 | 55/45 | 850 | 800 | 1.5 |
| 22 | Sample-9 | 0.2 | α-Fe₂O₃ | 5.0 | 8 | 55 | Co-γ-Fe₂O₃ | 800 | 55/45 | 850 | 800 | 1.5 |
| 23 | Sample-10 | 0.2 | α-Fe₂O₃ | 5.0 | 8 | 55 | Co-γ-Fe₂O₃ | 800 | 55/45 | 850 | 800 | 1.5 |
| 24 | Sample-11 | 0.2 | α-Fe₂O₃ | 5.0 | 8 | 55 | Co-γ-Fe₂O₃ | 800 | 55/45 | 850 | 800 | 1.5 |
| 25 | Sample-12 | 0.2 | α-Fe₂O₃ | 5.0 | 8 | 55 | Co-γ-Fe₂O₃ | 800 | 55/45 | 850 | 800 | 1.5 |
| 26 | Co—Ti-Barrium ferrite | 0.2 | α-Fe₂O₃ | 5.0 | 8 | 55 | Co-γ-Fe₂O₃ | 800 | 55/45 | 850 | 800 | 1.5 |

From Table 4, it is seen that the samples prepared according to the present invention surpass the comparative samples.

The samples prepared in Examples 14 through 27 above were evaluated in the same manner as in Example 2.

TABLE 5

| Sample | RF Output (dB) | Running Durability | Still frame Durability (min) | Coating Deffect (Streaks) | Thickness distribution | |
|---|---|---|---|---|---|---|
| | | | | | Y* | X* |
| Inv. 14 | 4.2 | A | 120 | 0 | 0.1 | 0.05 |
| Inv. 15 | 4.0 | A | 120 | 0 | 0.1 | 0.05 |
| Inv. 16 | 4.1 | A | 120 | 0 | 0.1 | 0.05 |
| Inv. 17 | 4.3 | A | 120 | 0 | 0.1 | 0.05 |
| Inv. 18 | 4.4 | A | 120 | 0 | 0.1 | 0.05 |
| Inv. 19 | 4.7 | A | 120 | 0 | 0.1 | 0.05 |
| Inv. 20 | 5.3 | A | 120 | 0 | 0.1 | 0.05 |
| Inv. 21 | 4.1 | A | 120 | 0 | 0.1 | 0.05 |
| Inv. 22 | 4.3 | A | 120 | 0 | 0.1 | 0.05 |
| Inv. 23 | 4.4 | A | 120 | 0 | 0.1 | 0.05 |
| Inv. 24 | 4.0 | A | 120 | 0 | 0.1 | 0.05 |
| Inv. 25 | 4.1 | A | 120 | 0 | 0.1 | 0.05 |
| Inv. 26 | 1.9 | A | 120 | 1 | 0.15 | 0.1 |
| Inv. 27 | 1.0 | A | 120 | 2 | 0.2 | 0.15 |

Table 5 shows that the magnetic recording medium of the present invention is excellent in electromagnetic transferring property, durability, coatability and production stability.

The magnetic recording of the present invention as having an interlayer is hereinafter described in more detail by means of the following examples.

For each coating compound, the following components were kneaded and dispersed, using a kneader and a sand mill, to yield an uppermost layer magnetic coating compound, an interlayer coating compound and a lower layer coating compound.

Uppermost layer magnetic coating compound a-1

| | |
|---|---|
| Ferromagnetic metal powder (listed in Table 1) (average major axis length 0.15 μm, Hc: 1700 Oe, BET 53 m$^2$/g, crystallite size 150 Å, axial ratio 8, (σs 120 emu/g) | 100 parts |
| Vinyl chloride resin containing potassium sulfonate (MR110, produced by Nippon Zeon Co., Ltd.) | 10 parts |
| Polyurethane containing sodium sulfonate (UR-8700, produced by Toyobo Co., Ltd.) | 10 parts |
| (α-alumina (average grain size 0.15 μm) | 8 parts |
| Carbon black (average grain size 40 nm) | 0.5 parts |
| Stearic acid | 1 part |
| Butyl stearate | 1 part |
| Cyclohexanone | 100 parts |
| Methyl ethyl ketone | 100 parts |
| Toluene | 100 parts |

Uppermost layer magnetic coating compounds a-1', a-2, a-3 and a-4

Uppermost layer magnetic coating compounds were prepared in the same manner as for the above uppermost layer magnetic coating compound a-1, except that the ferromagnetic metal powders listed in Table 1 were used.

Uppermost layer magnetic coating compound b

Uppermost layer magnetic coating compound b was prepared in the same manner as for the above uppermost layer magnetic coating compound a-1, except that the 100 parts of ferromagnetic metal powder was replaced with a Co-Ti barium ferrite (Hc 1100 Oe, BET 46 m$^2$/g, σs 64 emu/g, tabular ratio 4).

Uppermost layer magnetic coating compound c

Uppermost layer magnetic coating compound c was prepared in the same manner as for the above uppermost layer magnetic coating compound a-1, except that the 100 parts of ferromagnetic metal powder was replaced with 100 parts of Co-adhered iron oxide (Hc 1500 Oe, BET 50 m$^2$/g, crystallite size 320 Å, average major axis length 0.14 μm, axial ratio 8).

Interlayer coating compound A

| | |
|---|---|
| α-Fe$_2$O$_3$ (major axis diameter 0.10 μm, minor axis diameter 0.02 μm, axial ratio 9, BET 55 m$^2$/g, surface treated with Si—Al compound, Si content per (α-Fe$_2$O$_3$ 1.2 wt %, Al content per α-Fe$_2$O$_3$ 0.2 wt %) | 100 parts |
| Vinyl chloride resin containing potassium sulfonate (MR110, produced by Nippon Zeon Co., Ltd.) | 12 parts |
| Polyurethane containing sodium sulfonate (UR-8700, produced by Toyobo Co., Ltd.) | 8 parts |
| α-alumina (average grain size 0.2 μm) | 5 parts |
| Carbon black (average grain size 15 nm) | 10 parts |
| Stearic acid | 1 part |
| Butyl stearate | 1 part |
| Cyclohexanone | 100 parts |
| Methyl ethyl ketone | 100 parts |
| Toluene | 100 parts |

Interlayer coating compound B

Interlayer coating B was prepared in the same manner as for interlayer coating compound A, except that the 100 parts of α-Fe$_2$O$_3$ was replaced with Fe-Si-Al Sendast alloy powder (Hc 40 (A/m), μ=200 (H/m), average major axis length 0.15 μm, crystallite size 14 nm, powder Si content 1.2% by weight, Al content 0.2% by weight).

Interlayer coating compound C

Interlayer coating compound C was prepared in the same manner as for interlayer coating compound A, except that the 100 parts of α-Fe$_2$O$_3$ was replaced with 45 parts of Co-adhered iron oxide (Hc 800 Oe, BET 45 m$^2$/g, crystallite size 350 Å, average major axis length 0.19 μm, axial ratio 9).

Interlayer coating compound D

Interlayer coating compound D was prepared in the same manner as for interlayer coating compound A, except that the 100 parts of α-Fe$_2$O$_3$, 5 parts of α-alumina and 10 parts of carbon black were not used.

Lower layer magnetic coating compound I

Lower layer magnetic coating compound I was prepared in the same manner as for interlayer coating compound A, except that the 100 parts of ferromagnetic metal powder was replaced with 100 parts of Co-adhered iron oxide (Hc 6500 Oe, BET 35 m$^2$/g, crystallite size 400 Å, average major axis length 0.24 μm, axial ratio 8).

Lower layer magnetic coating compound J

Lower layer magnetic coating compound J was prepared in the same manner as for interlayer coating compound A, except that the 100 parts of ferromagnetic metal powder was replaced with 100 parts of γ-iron oxide (Hc 3500 Oe, BET 30 m$^2$/g, crystallite size 430 Å, average major axis length 0.30 μm, axial ratio 9).

Examples 201 through 219 and Comparative Examples 201 through 207

To each of the upper layer coating compounds, interlayer coating compounds and lower layer magnetic coating compounds listed in Tables 6 and 7, all containing a ferromagnetic powder, 5 parts of a polyisocyanate compound (Coronate L, produced by Nippon Polyurethane Industry Co., Ltd.) was coated. Then, each coating compound was coated on a polyethylene terephthalate film of 10 μm thickness by the wet-on-wet method. While the coating remained in a wet state, the film was subjected to a magnetism orientation treatment and then dried, followed by calendering for surface smoothing, to yield a magnetic layer consisting of a lower layer, interlayer and upper layer whose thicknesses are listed in Table 7.

A coating compound of the following composition was coated on the opposite face (back face) of the polyethylene terephthalate film, followed by drying and calendering under the above-described conditions, to form a back coating layer of 0.8 μm thickness to yield a wide bulk magnetic tape.

| Carbon black (Raven 1035) | 40 parts |
|---|---|
| Barium sulfate (average particle size 300 nm) | 10 parts |
| Nitrocellulose | 25 parts |
| Polyurethane resin (N-2301, produced by Nippon Polyurethane Co., Ltd.) | 25 parts |
| Polyisocyanate compound (Coronate L, produced by Nippon Polyurethane Co., Ltd.) | 10 parts |
| Cyclohexanone | 400 parts |
| Methyl ethyl ketone | 250 parts |
| Toluene | 250 parts |

The thus-obtained original magnetic tape was slit to yield an 8-mm or ½-inch wide magnetic recording medium for video recording. These magnetic recording media were evaluated as follows: The results are given in Tables 7, 8 and 9.

Evaluation

Overall composition

The content ratios of Fe, Co, Ni, Nd, Si and Al in the overall composition of the ferromagnetic metal powder were calculated by the fundamental parameter method (hereinafter referred to as the FP method) after the X-ray fluorescence intensity of each element was determined using a wavelength dispersion type X-ray fluorometer (WDX).

The FP method is described below.

X-ray fluorometry was conducted using the WDX system 3080, produced by Rigaku Denki K.K., under the conditions shown below.
X-ray bulb: Rhodium bulb
Output: 50 KV, 50 mA
Spectral crystals: LiF (for Fe, Co, Ni and Nd), PET (for Al), RX-4 (for Si)
Absorber: 1/1 (1/10 for Fe alone)
Slit: COARSE
Filter: OUT
PHA: 15 to 30 (for Al and Si), 10 to 30 (for Fe, Co, Ni and Nd) p0 Counting time: peak=40 seconds, background=40 seconds (measured at two points around the peak)

This instrument is not limitative; various X-ray fluorometers can be used.

Four metal compounds were used as standard samples as follows:

Standard sample 1 was SRM 1219, an alloy produced by Analytical Reference Materials International Company (0.15% C, 0.42% Mn, 0.03% P, 0.55% Si, 0.16% Cu, 2.16% Ni, 15.64% Cr, 0.16% Mo, 0.06% V, by weight).

Standard sample 2 was SRM 1250, an alloy produced by Analytical Reference Materials International Company (37.78% Ni, 0.08% Cr, 0.01% Mo, 16.10% Co, 0.99% Al, by weight).

Standard sample 3 was a magnetic iron oxide powder (0.14% Mn, 0.15% P, 0.19% S, 0.36% Si, 3.19% Co, 1.26% Zn, 0.07% Ca, 0.02% Na, by weight).

Standard sample 4 was a ferromagnetic metal powder (2.73% Nd by weight).

The weight percent values for the elements in standard samples 1 and 2 are from data sheets supplied by the manufacturer, those in standard samples 3 and 4 are analytical values obtained with an ICP light emission analyzer. These figures were input as the elemental analytical composition of the standard sample for the calculation by the FP method as follows:

Calculations by the FP method were made using the fundamental parameter software Version 2.1, produced by Technos, under the following conditions:
Model sample: Bulk sample
Balanced component sample: Fe
Input component: Found X-ray intensity (KCPS)
Analytical unit: % by weight The content ratio of each element (% by weight) was obtained relative to the weight of Fe atoms.

Surface composition

The content ratios of Fe, Co, Ni, Nd, Si and Al in the surface composition of the ferromagnetic metal powder were obtained using an XPS surface analyzer.

The analytical procedure employed is described below.

The XPS surface analyzer was set to the following conditions:
X-ray anode: Mg
Resolution: 1.5 to 1.7 eV (defined as the half-value width of the 3d5/2 peak of clear Ag)

No adhesive tapes were used to fix the sample. Although various types of XPS surface analyzer can be used, the ESCALAB-200R of VG Company was used herein.

Narrow scans were conducted over the measuring range shown below to obtain the spectra of respective elements. Data intake interval was set at 0.2 eV, and data were integrated until the minimum count shown in Table 3 was obtained.

For the spectrum thus obtained, energy position was corrected to have a C peak at 284.6 eV.

Next, to process data on the COMMON DATA PROCESSING SYSTEM Ver. 2.3 produced by VAMAS-SCA-Japan (hereinafter referred to as the VAMAS software), each of the above spectra was transferred to a computer on which the VAMAS software is available, using a software supplied by the instrument manufacturer.

After the transferred spectrum was converted into data in the VAMAS format, using the VAMAS software, the data were processed as follows:

Before quantitative processing, the count scale was calibrated for each element for 5-point smoothing.

The quantitative processing was conducted as follows.

With the peak position of each element as the center, peak area intensity was determined over the quantitation range given in Table 9. Next, percent atomic number of each element was calculated, using the coefficient of sensitivity given in Table 9, relative to the number of Fe atoms.

Electric properties (dB), RF output, CN ratio

Using the 8-mm video camera CCDV-900, produced by Sony Corporation, RF output (dB) was determined at 7 MHz. The difference (dB) between output at 7 MHz and that at 6 MHz was calculated for CN ratio.

Running durability

Whole-length video recording and reproduction was conducted at 40° C. temperature and 20% humidity using S-550 (produced by Sony Corporation). The number of head clogs was counted, in which a head clog was defined as an output decline of not less than 2 dB for 1 or more seconds.

Control output

Control output value (dB), in comparison with a reference tape value, was determined using BR-S711 (produced by Victor Japan).

Surface roughness after multiple layer coating

The surface after multiple layer coating was observed for surface roughness under a light microscope, the degree of surface roughness being evaluated in 5 grades:

TABLE 6

| | Content as a whole | | | | | | | | Surface Content | | | | | | | | Hc (Oe) | Major axis length (μm) | BET (m²/g) | Crystallite size (A) |
|---|---|---|---|---|---|---|---|---|---|---|---|---|---|---|---|---|---|---|---|---|
| | Fe | Rare earth | Al | Na | Ca | Co | Ni | Si | Fe | Rare earth | Al | Na | Ca | Co | Ni | Si | | | | |
| a-1 | 100 | Nd 4 | 6 | 0.001 | 0.3 | 0 | 0 | 0 | 100 | Nd 15 | 180 | 20 | 10 | 0 | 0 | 0 | 1700 | 0.15 | 53 | 150 |
| a-1' | 100 | Nd 4 | 6 | 0.001 | 0.3 | 0 | 0 | 0 | 100 | Nd 15 | 180 | 20 | 10 | 0 | 0 | 0 | 1500 | 0.18 | 53 | 180 |
| a-2 | 100 | Sm 5 | 4 | 0.08 | 0.1 | 2 | 1 | 0.5 | 100 | Sm 25 | 120 | 30 | 12 | 0 | 3 | 20 | 1750 | 0.16 | 50 | 180 |
| a-3 | 100 | Y 3 | 2 | 0.005 | 2.0 | 1 | 20 | 4 | 100 | Y 10 | 80 | 23 | 30 | 0 | 0.01 | 130 | 1650 | 0.17 | 51 | 190 |
| a-4 | 100 | Pr 1 | 10 | 0.01 | 1.0 | 20 | 7 | 2 | 100 | Pr 3 | 180 | 27 | 25 | 0.01 | 0 | 80 | 1700 | 0.15 | 55 | 150 |

TABLE 7

| | Coating composition | | | Layer thickness | | | Output (dB) | | Head clog | Control output | Surface Roughness |
|---|---|---|---|---|---|---|---|---|---|---|---|
| | Upper layer | Inter layer | lower layer | Upper layer | Inter layer | lower layer | MHz | CN | | | |
| Inv. | | | | | | | | | | | |
| 1 | a-1 | A | I | 0.2 | 0.5 | 2.0 | 2.0 | 1.5 | 0 | 2.0 | 5 |
| 2 | a-2 | A | I | 0.2 | 0.5 | 2.0 | 1.8 | 1.4 | 0 | 2.0 | 5 |
| 3 | a-3 | A | I | 0.2 | 0.5 | 2.0 | 2.0 | 1.5 | 0 | 2.0 | 5 |
| 4 | a-4 | A | I | 0.2 | 0.5 | 2.0 | 1.7 | 1.4 | 0 | 2.0 | 5 |
| 5 | a-1 | B | I | 0.2 | 0.5 | 2.0 | 1.5 | 1.0 | 0 | 2.0 | 5 |
| 6 | a-1 | C | I | 0.2 | 0.5 | 2.0 | 1.6 | 1.3 | 0 | 3.0 | 5 |
| 7 | a-1 | D | I | 0.2 | 0.5 | 2.0 | 0.6 | 0.5 | 1 | 2.0 | 4 |
| 8 | a-1 | A | II | 0.2 | 0.5 | 2.0 | 2.0 | 1.5 | 0 | 2.0 | 5 |
| 9 | a-1 | B | II | 0.2 | 0.5 | 2.0 | 1.7 | 1.4 | 0 | 2.0 | 5 |
| 10 | a-1 | C | II | 0.2 | 0.5 | 2.0 | 1.8 | 1.4 | 0 | 3.0 | 5 |
| 11 | a-1 | D | II | 0.2 | 0.5 | 2.0 | 0.6 | 0.6 | 1 | 2.0 | 4 |
| 12 | b | A | I | 0.2 | 0.5 | 2.0 | 1.3 | 0.9 | 0 | 2.0 | 5 |
| 13 | b | B | I | 0.2 | 0.5 | 2.0 | 1.2 | 0.8 | 0 | 2.0 | 5 |
| 14 | b | C | I | 0.2 | 0.5 | 2.0 | 1.0 | 0.7 | 0 | 3.0 | 5 |
| 15 | b | D | I | 0.2 | 0.5 | 2.0 | 0.1 | 0.2 | 0 | 2.0 | 4 |
| 16 | c | A | I | 0.2 | 0.5 | 2.0 | −0.2 | −0.1 | 1 | 2.0 | 5 |
| 17 | a-1 | A | I | 0.15 | 0.8 | 2.5 | 2.3 | 1.8 | 0 | 3.0 | 5 |
| Comp | | | | | | | | | | | |
| 1 | a-1 | — | — | 3.0 | — | — | 1.0 | 0.7 | 5 | 0 | — |
| 2 | a-1 | A | a-1 | 0.2 | 0.5 | 2.0 | 1.5 | 1.1 | 3 | −1.0 | 2 |
| 3 | b | A | a-1 | 0.2 | 0.5 | 2.0 | 0.8 | 0.6 | 3 | −1.0 | 1 |
| 4 | a-1 | B | a-1 | 0.2 | 0.5 | 2.0 | 1.2 | 0.8 | 3 | −1.0 | 2 |
| 5 | a-1 | D | a-1 | 0.2 | 0.5 | 2.0 | −0.2 | −0.3 | 5 | −1.0 | 1 |
| 6 | a-1 | — | I | 0.2 | — | 2.0 | 1.0 | 0.8 | 3 | 1.0 | 3 |
| 7 | a-1 | A | — | 0.2 | 2.0 | — | 1.4 | 0.9 | 2 | −8.0 | 3 |

TABLE 8

| | Coating composition | | | | Layer thickness | | | | Output (dB) | | Head clog | Control output | Surface roughness |
|---|---|---|---|---|---|---|---|---|---|---|---|---|---|
| | Upper layer | | | | Upper layer | | | | | | | | |
| | Uppermost layer | Upper layer | Inter layer | Lower layer | Uppermost layer | Upper layer | Inter layer | Lower layer | 7 MHz | CN | | | |
| Inv. 18 | a-1 | a-1' | A | I | 0.1 | 0.1 | 0.6 | 2.0 | 3.0 | 2.5 | 0 | 2.0 | 5 |
| Inv. 19 | a-1 | a-1' | A | II | 0.1 | 0.1 | 0.6 | 2.0 | 3.0 | 2.5 | 0 | 2.0 | 5 |

TABLE 9

| | Coercive force (Oe) | | Saturated magnetic flux density (Bm) | Surface roughness $R_{102}$ |
|---|---|---|---|---|
| | Upper layer | Lower layer | Inter layer | |
| Inv. 1 | 1700 | 700 | | 13 |
| Inv. 2 | 1750 | 700 | | 13 |
| Inv. 3 | 1650 | 700 | | 13 |
| Inv. 4 | 1700 | 700 | | 13 |
| Inv. 5 | 1700 | 700 | | 14 |
| Inv. 6 | 1700 | 700 | 800 | 13 |
| Inv. 7 | 1700 | 700 | | 16 |
| Inv. 8 | 1700 | 400 | | 13 |
| Inv. 9 | 1700 | 400 | | 13 |
| Inv. 10 | 1700 | 400 | 800 | 13 |
| Inv. 11 | 1700 | 400 | | 16 |
| Inv. 12 | 1150 | 700 | | 15 |
| Inv. 13 | 1150 | 700 | | 15 |
| Inv. 14 | 1150 | 700 | 800 | 15 |
| Inv. 15 | 1150 | 700 | | 18 |
| Inv. 16 | 1560 | 700 | | 19 |
| Inv. 17 | 1700 | 700 | | 13 |
| Inv. 18 | Upper: 1700 Lower: 1550 | 700 | | 12 |
| Inv. 19 | Upper: 1700 Lower: 1550 | 400 | | 13 |
| Comp. 1 | 1700 | — | | 18 |
| Comp. 2 | 1700 | 1700 | | 15 |
| Comp. 3 | 1150 | 1700 | | 20 |
| Comp. 4 | 1700 | 1700 | | 17 |
| Comp. 5 | 1700 | 1700 | | 24 |
| Comp. 6 | 1700 | 700 | | 18 |
| Comp. 7 | 1700 | — | | 16 |

The other embodiment of the invention is listed.

A magnetic recording medium having a lower layer (L) containing a ferromagnetic powder, an interlayer (M) containing a nonmagnetic powder or a material of high magnetic permeability, and an upper layer (H) containing a magnetic powder, all formed in this order on a support wherein a coercive force Hc of the lower layer is smaller than a coercive force Hc of the upper layer.

A magnetic recording medium having a lower layer (L) containing a ferromagnetic powder, an interlayer (M) containing a nonmagnetic powder or a material of high magnetic permeability, and an upper layer (H) containing a magnetic powder, all formed in this order on a support wherein a coercive force Hc of the lower layer is smaller than a coercive force Hc of the upper layer and saturated magnetic flux density Bm of the interlayer is not less than 600 G and not more than 1000 G.

A magnetic recording medium having a lower layer (L) containing a ferromagnetic powder, an interlayer (M) containing a binder resin, and an upper layer (H) containing a magnetic powder, all formed in this order on a support wherein a coercive force Hc of the lower layer is smaller than a coercive force Hc of the upper layer, and a coercive force Hc of the lower layer is smaller than a coercive force Hc of the upper layer.

A magnetic recording medium having a lower layer (L) containing a ferromagnetic powder, an interlayer (M) containing a binder resin, and an upper layer (H) containing a magnetic powder, all formed in this order on a support wherein a coercive force Hc of the lower layer is smaller than a coercive force Hc of the upper layer and the upper layer contains γ-iron oxide or Co-containing iron oxide.

A magnetic recording medium having a lower layer (L) containing a ferromagnetic powder, an interlayer (M) containing a nonmagnetic powder or a material of high magnetic permeability, and an upper layer (H) containing a magnetic powder, all formed in this order on a support wherein a coercive force Hc of the lower layer is smaller than a coercive force Hc of the upper layer and the upper layer contains ferromagnetic metal powder or hexagonal ferrite powder.

A magnetic recording medium having a lower layer (L) containing a ferromagnetic powder, an interlayer (M) containing a nonmagnetic powder or a material of high magnetic permeability, and an upper layer (H) containing a magnetic powder, all formed in this order on a support wherein a coercive force Hc of the lower layer is smaller than a coercive force Hc of the upper layer, and thickness of the under layer is not more than 0.5 μm.

A magnetic recording medium having a lower layer (L) containing a ferromagnetic powder, an interlayer (M) containing a nonmagnetic powder or a material of high magnetic permeability, and an upper layer (H) containing a magnetic powder, all formed in this order on a support wherein a coercive force Hc of the lower layer is smaller than a coercive force Hc of the upper layer, and surface roughness $R_{10Z}$ of the upper layer is 5 to 20 nm.

A magnetic recording medium having a lower layer (L) containing a ferromagnetic powder, an interlayer (M) containing a needle shaped nonmagnetic powder, and an upper layer (H) containing a magnetic powder, all formed in this order on a support wherein a coercive force Hc of the lower layer is smaller than a coercive force Hc of the upper layer.

We claim:

1. A magnetic recording medium comprising a support, a lower layer, formed on the support, containing a nonmagnetic powder and a first ferromagnetic powder dispersed in a binder and an upper layer, formed on the lower layer, containing a second ferromagnetic powder dispersed in a binder, wherein the lower layer has a coercive force Hc of not less than 200 Oe and a saturation magnetic flux density of not less than 5 Gauss and not more than 1000 G, and the second ferromagnetic powder is a ferromagnetic metal powder containing Fe and Al as component elements.

2. The magnetic recording medium of claim 1 wherein the first ferromagnetic powder contains Fe, Al and one or more rare earth elements selected from the group consisting of Sm, Nd, Y and Pr as component elements.

3. The magnetic recording medium of claim 1 wherein the saturated magnetic flux density Bm is not less than 600 Gauss and not more than 1000 G.

4. A magnetic recording medium comprising a support, a lower layer formed on the support which lower layer contains a nonmagnetic powder and a first ferromagnetic powder dispersed in a binder and an upper layer formed on the lower layer which upper layer contains a second ferromagnetic powder dispersed in a binder, wherein the weight ratio A/B of nonmagnetic powder A to ferromagnetic powder B in the lower layer being $50/50 < A/B \leq 99/1$, nonmagnetic powder A having a true specific gravity of not less than 2.5 and the ferromagnetic powder being a ferromagnetic metal powder containing Fe and Al as component elements.

5. The magnetic recording medium of claim 4 wherein the weight ratio A/B of nonmagnetic powder A to ferromagnetic powder B in the lower layer is preferably $50/50 < A/B < 200/100$.

6. The magnetic recording medium of claim 4 wherein the first ferromagnetic powder contains Fe, Al and one or more rare earth elements selected from the group consisting of Sm, Nd, Y and Pr as component elements.

7. A magnetic recording medium comprising a support, a lower layer, formed on the support, containing a nonmagnetic powder and a first ferromagnetic powder dispersed in a binder and an upper layer, formed on the lower layer, containing a second ferromagnetic powder dispersed in a binder, wherein the lower layer has a coercive force Hc of not less than 200 Oe and a saturated magnetic flux density Bm of not less than 600 Gauss and not more than 1000 Gauss.

* * * * *